United States Patent
Banerjee et al.

(10) Patent No.: US 11,876,875 B2
(45) Date of Patent: Jan. 16, 2024

(54) SCALABLE FINE-GRAINED RESOURCE COUNT METRICS FOR CLOUD-BASED DATA CATALOG SERVICE

(71) Applicant: Oracle International Corporation, Redwood Shores, CA (US)

(72) Inventors: Rick Banerjee, Bangalore (IN); Rajiv Dimri, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/497,186

(22) Filed: Oct. 8, 2021

(65) Prior Publication Data

US 2023/0113327 A1    Apr. 13, 2023

(51) Int. Cl.
*H04L 67/566* (2022.01)
*H04L 67/147* (2022.01)
*H04L 67/75* (2022.01)
*H04L 41/06* (2022.01)

(52) U.S. Cl.
CPC .......... *H04L 67/566* (2022.05); *H04L 41/06* (2013.01); *H04L 67/147* (2013.01); *H04L 67/75* (2022.05)

(58) Field of Classification Search
CPC .......... H04L 67/2833; H04L 67/1014; H04L 67/147; H04L 67/36
See application file for complete search history.

(56) References Cited

U.S. PATENT DOCUMENTS

| | | | |
|---|---|---|---|
| 10,713,272 B1* | 7/2020 | Caldwell | G06F 16/2358 |
| 11,068,475 B2* | 7/2021 | Boutros | G06F 21/6218 |
| 11,687,568 B2 | 6/2023 | Sankaranarayanan | |
| 2008/0065668 A1* | 3/2008 | Spence | G06Q 10/06 |
| 2015/0178167 A1 | 6/2015 | Kulkarni et al. | |
| 2017/0118247 A1* | 4/2017 | Hussain | H04L 41/28 |
| 2018/0075219 A1* | 3/2018 | Klein | G16H 20/70 |
| 2018/0150548 A1* | 5/2018 | Shah | G06F 16/285 |
| 2019/0311132 A1* | 10/2019 | Arnoth | G06F 21/53 |

(Continued)

OTHER PUBLICATIONS

"A Beginner's Guide to Attention Mechanisms and Memory Networks", Wikipedia, Available Online at: https://wiki.pathmind.com/attention-mechanism-memory-network, Accessed from Internet on: Mar. 2, 2021, 12 pages.

(Continued)

*Primary Examiner* — Dhairya A Patel
(74) *Attorney, Agent, or Firm* — Kilpatrick Townsend & Stockton LLP

(57) ABSTRACT

In some aspects, an aggregation system of a cloud system may receive, by an aggregation system of a cloud system and from a data catalog, one or more events from one or more data sources of the cloud system, the one or more data sources having one or more resource types. The aggregation system may store event data to a message queue. The aggregation system of a cloud system may process, by one or more workers of the cloud system, a subset of events from the message queue at a time. The aggregation system may for each event in the subset of events: determine whether an event source has been updated based on information in the event. The aggregation system may in accordance with a determination that the event source has been updated, send an updated status to a dashboard, the dashboard configured to be displayed on a user device.

17 Claims, 17 Drawing Sheets

(56) References Cited

U.S. PATENT DOCUMENTS

| | | | |
|---|---|---|---|
| 2020/0104648 A1 | 4/2020 | Yadav | |
| 2020/0125746 A1 | 4/2020 | Joshi et al. | |
| 2020/0382457 A1* | 12/2020 | Kim | H04L 51/08 |
| 2021/0182267 A1* | 6/2021 | Andreakis | G06F 16/219 |
| 2021/0200878 A1 | 7/2021 | Brannon et al. | |
| 2021/0365464 A1* | 11/2021 | Willcox | G06F 16/24568 |
| 2021/0374244 A1 | 12/2021 | Dontov et al. | |
| 2022/0114163 A1* | 4/2022 | Seetharaman | G06F 16/2379 |

OTHER PUBLICATIONS

"A Beginner's Guide to Convolutional Neural Networks (CNNs)", Wikipedia, Available Online at: https://wiki.pathmind.com/convolutional-network, Accessed from Internet on: Mar. 2, 2021, 13 pages.

"A Beginner's Guide to Deep Reinforcement Learning", Wikipedia, Available Online at: https://wiki.pathmind.com/deep-reinforcement-learning, Accessed from Internet on: Mar. 2, 2021, 13 pages.

"A Beginner's Guide to Eigenvectors, Eigenvalues, PCA, Covariance and Entropy", Wikipedia, Available Online at: https://wiki.pathmind.com/eigenvector, Accessed from Internet on: Mar. 2, 2021, 16 pages.

"A Beginner's Guide to Graph Analytics and Deep Learning", Wikipedia, Available Online at: https://wiki.pathmind.com/graph-analysis, Accessed from Internet on: Mar. 2, 2021, 7 pages.

"A Beginner's Guide to LSTMs and Recurrent Neural Networks", Wikipedia, Available Online at: https://wiki.pathmind.com/lstm, Accessed from Internet on: Mar. 2, 2021, 15 pages.

"A Beginner's Guide to Markov Chain Monte Carlo, Machine Learning & Markov Blankets", Wikipedia, Available Online at: https://wiki.pathmind.com/markov-chain-monte-carlo, Accessed from Internet on: Mar. 2, 2021, 8 pages.

"A Beginner's Guide to Multilayer Perceptrons (MLP)", Wikipedia, Available Online at: https://wiki.pathmind.com/multilayer-perceptron, Accessed from Internet on: Mar. 2, 2021, 4 pages.

"A Beginner's Guide to Neural Networks and Deep Learning", Wikipedia, Available Online at: https://wiki.pathmind.com/neural-network, Accessed from Internet on: Mar. 1, 2021, 16 pages.

"A Beginner's Guide to Word2Vec and Neural Word Embeddings", Wikipedia, Available Online at: https://wiki.pathmind.com/word2vec, Accessed from Internet on: Mar. 2, 2021, 12 pages.

"Artificial Intelligence (AI) vs. Machine Learning vs. Deep Learning", Wikipedia, Available Online at: https://wiki.pathmind.com/ai-vs-machine-learning-vs-deep-learning, Accessed from Internet on: Mar. 2, 2021, 8 pages.

"Data Profiling Overview", Oracle Cloud Infrastructure, Accessed from Internet on: Feb. 10, 2021, 10 pages.

"Evaluation Metrics for Machine Learning—Accuracy, Precision, Recall, and F1 Defined", Wikipedia, Available Online at: https://wiki.pathmind.com/accuracy-precision-recall-f1, Accessed from Internet on: Mar. 2, 2021, 5 pages.

"NVIDIA Research Achieves AI Training Breakthrough Using Limited Datasets", Wikipedia, Available Online at: https://blogs.nvidia.com/blog/2020/12/07/neurips-research-limited-data-gan/, Accessed from Internet on: Mar. 2, 2021, 14 pages.

"OCI Data Catalog Product Management Home", Oracle Cloud Infrastructure, Feb. 7, 2020, 3 pages.

"Oracle Cloud Infrastructure Data Catalog", Available online at: https://www.oracle.com/in/big-data/data-catalog/, Accessed from Internet on: Feb. 10, 2021, 11 pages.

"Oracle Cloud Infrastructure Data Catalog", Available online at: https://www.oracle.com/a/ocom/docs/ebook-cloud-infrastructure-data-catalog.pdf, Accessed from Internet on: Feb. 10, 2021, 15 pages.

"Oracle Cloud Infrastructure Data Catalog", Available online at: https://www.oracle.com/a/ocom/docs/oci-data-catalog-data-sheet.pdf, Accessed from Internet on: Feb. 10, 2021, 5 pages.

"Simulation, AI, Optimization and Complexity", Wikipedia, Available Online at: https://wiki.pathmind.com/simulation-optimization-ai, Accessed from Internet on: Mar. 2, 2021, 8 pages.

"Stanford Named Entity Recognizer (NER)", Available online at: https://nlp.stanford.edu/software/CRF-NER.shtml, Accessed from Internet on: Feb. 10, 2021, 5 pages.

"Symbolic Reasoning (Symbolic AI) and Machine Learning", Wikipedia, Available Online at: https://wiki.pathmind.com/symbolic-reasoning, Accessed from Internet on: Mar. 2, 2021, 14 pages.

U.S. Appl. No. 17/377,603, "Non-Final Office Action", dated Jul. 28, 2022, 14 pages.

U.S. Appl. No. 17/377,603, "Notice of Allowance", dated Feb. 10, 2023, 10 pages.

U.S. Appl. No. 17/560,132, "Final Office Action", dated Aug. 22, 2023, 26 pages.

Dandekar et al., "A Comparative Study of Synthetic Dataset Generation Techniques", International Conference on Database and Expert Systems Applications, 2018, pp. 387-395.

Gujjewar, "Oracle Cloud Infrastructure Data Catalog Overview", Available online at: https://www.youtube.com/watch?v=ej0uQfHQHYU, Sep. 19, 2020, 1 page.

Isola et al., "Image-to-Image Translation with Conditional Adversarial Networks", Available Online at: https://arxiv.org/abs/1611.07004, Nov. 22, 2017, 17 pages.

Joshi, "Generative Adversarial Networks (GANs) for Synthetic Dataset Generation With Binary Classes", Available online at: https://datasciencecampus.ons.gov.uk/projects/generative-adversarial-networks-gans-for-synthetic-dataset-generation-with-binary-classes/#:~:text=GANs%20work%20by%20training%20a,to%20make%20it%20more%20realistic, Feb. 21, 2019, 36 pages.

Kubara, "GANs and Missing Data Imputation", Available online at: https://towardsdatascience.com/gans-and-missing-data-imputation-815a0cbc4ece, Aug. 6, 2019, 9 pages.

Ledig et al., "Photo-Realistic Single Image Super-Resolution Using a Generative Adversarial Network", Wikipedia, Available Online at: https://arxiv.org/pdf/1609.04802.pdf, 2017, 19 pages.

Lotter et al., "Unsupervised Learning of Visual Structure Using Predictive Generative Networks", Wikipedia, Available Online at: https://arxiv.org/pdf/1511.06380.pdf, 2016, 12 pages.

Manning et al., "The Stanford CoreNLP Natural Language Processing Toolkit", Proceedings of 52nd Annual Meeting of the Association for Computational Linguistics, Jan. 2014, pp. 55-60.

Nicholson, "A Beginner's Guide to Generative Adversarial Networks (GANs)", Available online at: https://wiki.pathmind.com/generative-adversarial-network-gan, Accessed from Internet on: Feb. 9, 2021, 27 pages.

Reed et al., "Generative Adversarial Text to Image Synthesis", Wikipedia, Available Online at: URL:http://proceedings.mlr.press/v48/reed16.html, Jun. 5, 2016, 10 pages.

Swalin, "How to Handle Missing Data", Available online at: https://towardsdatascience.com/how-to-handle-missing-data-8646b18db0d4, Jan. 31, 2018, 9 pages.

Yoon et al., "GAIN: Missing Data Imputation using Generative Adversarial Nets", Available online at: https://arxiv.org/pdf/1806.02920.pdf, Jun. 7, 2018, 10 pages.

* cited by examiner

SCALABLE FINE-GRAINED RESOURCE COUNT METRICS FOR CLOUD-BASED DATA CATALOG SERVICE

BACKGROUND

Techniques exist for a cloud-based multi-tenant data catalog that harvests data sources to allow authorized sources to search and analyze metadata. However, data catalogs traditionally use a pull-based approach that is difficult to scale because the number of resource queries grows linearly with the number of supported resource types.

BRIEF SUMMARY

Techniques are provided for aggregating data for a cloud-based data catalog service.

In an embodiment, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method. The computer-implemented method also includes receiving, by an aggregation system of a cloud system, one or more events from one or more data sources of the cloud system. The one or more data sources having one or more resource types. The method also includes, storing, by the aggregation system, event data to a message queue. The method also includes processing, by one or more workers of the cloud system, a subset of events from the message at a time. The method also includes, for each event in a subset of events: determining whether the status of the source has been updated based on the information in the event. The method also includes, in accordance with a determination that the event source has been updated, sending the updated status to a dashboard. The dashboard being configured to display on a user device.

One general aspect includes indicating, via a high watermark, a point in the message queue separating processed events from unprocessed events, and updating the high watermark in response to a worker processing the subset of events in the message queue.

In some embodiments, the one or more resource types include at least one of: data assets, data entities, filename patterns, logical data entities, attributes, glossaries, categories, terms, data catalog tags, or jobs.

One general aspect includes receiving, by the aggregation system, an event from a data source with a new resource type without the aggregation system being reconfigured.

In some embodiments, the message queue comprises a common queue for events from the one or more data sources and the one or more resource types in a common queue.

In some embodiments, one or more workers receives a subset of common queue events from the message queue.

One general aspect includes separating into one or more customer subsets before processing, where a customer subset comprises events associated with one tenant identifier (tenant ID).

One general aspect includes for each event in a subset of events: identifying, by the data catalog, an event source with a first status. The method also includes: for each event in the subset of events, creating, by the data catalog, a second status for the event source based at least in part of the event. The method also includes, for each event in the subset of events: determining, by the data catalog, whether the event source has been updated base at least in part on a comparison of the first status and the second status.

One general aspect includes one or more non-transitory computer-readable storage media may include computer-executable instructions that, when executed by one or more processors of a computing device, cause the computing device to perform instructions comprising: receiving one or more events from one or more data sources of the cloud system, the data sources having one or more resource types. The media also includes, storing event data to a message queue. The media also includes, for each event in the subset of events: determining whether the status of the source has been updated based on information in the event. The media also includes, in accordance with a determination that the event source has been updated, sending the updated status to a dashboard, the dashboard configured to be displayed on a user device.

One general aspect includes an aggregation system with memory configured to store a plurality of instructions and one or more processors configured to access the memory, and to execute the plurality of instructions to at least: receive one or more events from one or more data sources of a cloud system, the data sources having one or more resource types. The system is also configured to store event data to a message queue. The system is also configured to process, by one or more workers of the cloud system, a subset of events from the message queue at a time. The system is also configured to, for each event in the subset of events: determine whether the status of the source has been updated based on information in the event. The system is also configured to, in accordance with a determination that the event source has been updated, send the updated status to a dashboard, the dashboard configured to be displayed on a user device. Other embodiments of this aspect include corresponding computer systems, apparatus, and computer programs recorded on one or more computer storage devices, each configured to perform the actions of the methods.

DETAILED DESCRIPTION

Figure 1:
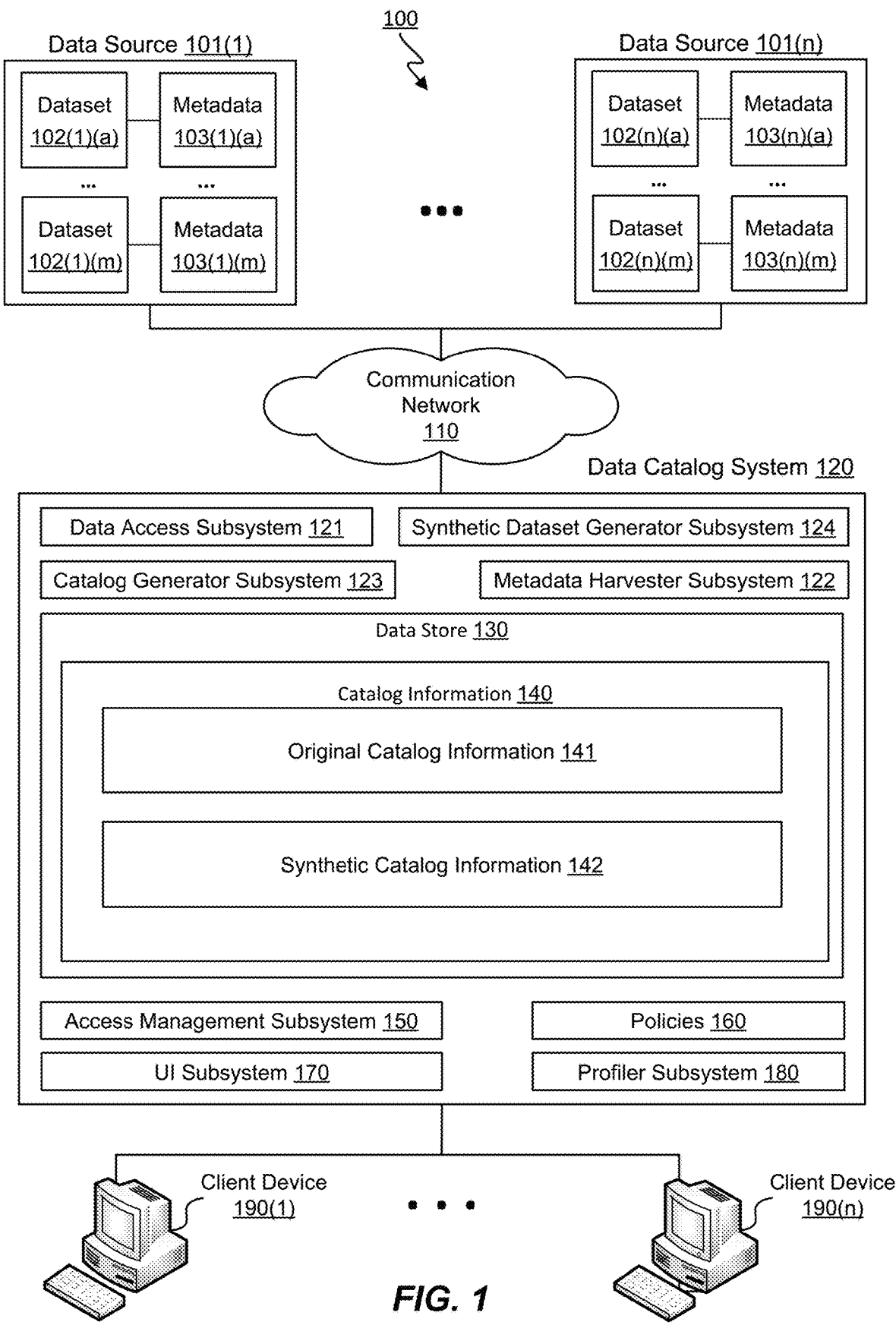
FIG. 1 is a simplified diagram of a distributed environment incorporating a data catalog system, according to various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure provide techniques for aggregating data for a cloud-based data catalog service. The data being aggregated by the cloud-based data catalog service can include resource type. A data catalog is an organized inventory of metadata that allows users to learn about data sources. The metadata, harvested from data sources, is stored in the data catalog data store. Data sources can include databases, object stores, file stores, document stores, message queues, applications, or the like.

Changes to the data catalog store generate events (e.g., a "create" event when the data catalog harvests a new resource or a "delete" event when a user deletes a resource) and the events are emitted from the data catalog's data store to a metrics aggregation system's message queue. Emitting data from the data store to the metrics aggregation system using a push-based approach, rather than the metrics aggregation system requesting data in a pull-based approach, allows for a scalable metrics collection and aggregation system. In a pull-based approach, a query is created for each resource type and a new query would have to be created for each new resource type. In a push-based approach, the resource types can all be sent to the metrics aggregation system without creating new queries for new resource types.

Workers in the metrics aggregation system (hereinafter referred to as an "aggregation system") can consume events from the queue to produce metrics data. Each worker can consume a subset, or workload, of events from the queue. The events can be consumed as the events are generated or the events can be consumed according to a set schedule. An indicator, called a high watermark, can separate consumed and unprocessed events in the queue. The worker can aggregate the events to produce a batch of metrics data that is sent to a dashboard where the client can view and analyze the metrics data.

The dashboard can include staging tables to receive data, intermediate tables where data is preprocessed, and charts or graphs to show data to the client. In addition to aggregating data, the workers can perform filtering or transformation of the metrics data. For example, the worker can look up the tenant IDs (also referred to as a customer ID) for the metrics and annotate the metrics to indicate details including whether the customer is a paying or free-tier customer.

In an illustrative example, a client's customers performed several activities including creating and deleting terms in data sources. Metadata about these activities is harvested by the data catalog and the metadata is stored in the data catalog's data store. Metadata about each of these activities is emitted from the data catalog's data store to the metrics aggregation queue as an event. These events occur over some period (e.g., a twelve hour period) and are consumed by a worker in the aggregation system according to a schedule (e.g., twice daily).

When the worker is scheduled to run, the worker collects a set amount of events, in this case six events, starting at the high watermark. As the worker processes events, it moves the high watermark to indicate the events in the queue that have been consumed. The worker analyzes its workload and determines that four terms were created and two terms were deleted. The six events are aggregated to produce metrics showing a net increase of two terms. The metrics are sent, along with metrics produced by other workers, to a staging table in the dashboard system where a product manager uses a chart created with the metrics to view resource creation trends.

Example Systems and Embodiments

FIG. 1 is a simplified diagram of a distributed environment 100 incorporating a data catalog system 120 according to certain embodiments. As shown in FIG. 1, distributed environment 100 comprise multiple data sources 101(1) ... 101(n) communicatively coupled to a data catalog system 120 via a communication network 110. Client devices 190(1) ... 190(n) may also be coupled to data catalog system 120 via one or more communication networks. Distributed environment 100 depicted in FIG. 1 is merely an example and is not intended to unduly limit the scope of claimed embodiments. Many variations, alternatives, and modifications are possible. For example, in some implementations, distributed environment 100 may have more or fewer systems than those shown in FIG. 1, may combine two or more systems, or may have a different configuration or arrangement of systems.

Communication network 110 can be of various types and can include one or more communication networks. Examples of communication network 110 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk®, Bluetooth®, and other protocols. In general, communication network 110 may include any infrastructure that facilitates communications between the various systems depicted in FIG. 1.

As previously described, the datasets of an enterprise can come in different forms and may be stored in various different locations. For example, in the embodiment depicted in FIG. 1, datasets 102(1)(a) to 102(1)(m) are stored on data source 101(1), datasets 102(n)(a) to 102(n)(m) are stored on data source 101(n), and the like. Each dataset may be associated with metadata that provides information about the dataset. For example, as depicted in FIG. 1, metadata 103(1)(a) is associated with dataset 102(1)(a), metadata 103(1)(m) is associated with dataset 102(1)(m), metadata 103(n)(m) is associated with dataset 102(n)(m), and the like. The data sources depicted in FIG. 1 could be data lakes, data warehouses, on-premise data stores, devices in a distributed network (e.g., an enterprise network), locations in one or more clouds, and the like. The datasets may be in different forms, such as files, tables, databases, autonomous databases, object stores, Big Data systems (e.g., Hive, Kafka), structured data, unstructured data, or data blobs, etc.

The metadata associated with a dataset may include different types of information about the dataset. For example, the metadata for a dataset may include: (a) technical metadata describing technical information about the dataset, such as information about schemas, tables, columns, file names, report names, or information about data sources system, etc.; (b) business metadata that captures business context and business knowledge information for a dataset that users have about the dataset and may include information about business descriptions, comments, annotations, classifications, fitness-for-use, ratings, business glossaries, and more; and (c) operational metadata identifying data usage patterns for the dataset, such as, when was a data object refreshed, which ETL (extract-transform-load) job created the dataset, how many times has a table been accessed by users and by which ones, and the like. The metadata for a dataset may also include other types of metadata information. The amount of metadata available for datasets may vary from one dataset to another. In certain embodiments, as described below, data catalog system 120 may introspect datasets to determine metadata for the datasets.

Data catalog system 120 depicted in FIG. 1 provides a solution to enterprises' data management needs and helps enterprises manage their data by creating an organized inventory of their data assets or datasets. Data catalog system 120 provides various functionalities that enable this organized inventory to be generated and used by enterprise users. For example, data catalog system 120 provides a discovery mechanism for discovering datasets for an enterprise. Data catalog system 120 provides harvesting capabilities for harvesting metadata associated with the original datasets. Data catalog system 120 then uses the results obtained from the discovery and harvesting processes to build or generate catalog information (referred to as a data catalog) for the enterprise. The data catalog for an enterprise provides a single, unified, all-encompassing and searchable view of the datasets of that enterprise.

In certain implementations, data catalog system 120 may be provided by a cloud service provider and the functionalities provided by data catalog system 120 are offered as cloud services to subscribing customers, which may be enterprises. Customers subscribing to the data catalog-related services provided by the cloud service provider can then avail themselves of the functionalities provided by data catalog system 120. The data cataloging service provides an organized inventory of enterprise data assets that may be stored in various environments including on-premise, cloud, and other environments.

A data catalog generated by data catalog system 120 for an enterprise can be used for different purposes. Since the data catalog for an enterprise provides a holistic view of an enterprise's datasets, it enables users to get deeper visibility and understanding into these datasets. The data catalog can be used to find and trace datasets including metadata related to the datasets such as business context information, operational metrics information, organizational information about how the dataset fits in with other datasets of the enterprise, and other like info.

A data catalog generated by data catalog system 120 for a set of original datasets may include information that reflects the metadata associated with the original datasets. As described above, the metadata may include various different types of metadata such technical metadata, business metadata, operational metadata, and other types of metadata. By including information reflecting the metadata of the original datasets in the data catalog, the metadata information is made searchable. For example, users may use the data catalog to search for original datasets meeting a certain criterion (or criteria) (e.g., to find tables containing a particular column attribute, to find datasets where the usage of the datasets is above some threshold, to find datasets having a certain threshold number of records, etc.). The data catalog may then further be used to access the datasets returned as search results in response to search queries specific by the user.

A data catalog generated by data catalog system 120 for an enterprise can be used by various different types of users. These users may include data engineers, data scientists, data analysts, data stewards, enterprise architects, management and marketing personnel, and the like, who are interested in finding, exploring, tracing, and analyzing the enterprise data. For example, a data catalog generated by data catalog system 120 may be used by users to easily find and access fit-for-use data for various purposes such as for data access, data analytics, data science, and data engineering.

In some instances, data catalog system 120 may generate a single data catalog for a customer, wherein the single data catalog stores information for all the customer's datasets that are cataloged by data catalog system 120. In some other instances, data catalog system 120 may generate multiple data catalogs for a customer, each data catalog containing information comprising information for a subset of the customer's original datasets.

In addition to the data cataloging functionalities described above, as described herein, in certain embodiments, data catalog system 120 is also configured to generate new datasets based upon the enterprise datasets that are cataloged. To clearly differentiate the enterprise datasets that are cataloged by data catalog system 120 from the new datasets that are generated by data catalog system 120 based upon the enterprise datasets, the enterprise datasets are referred to herein as "original datasets" and the datasets generated by data catalog system 120 are referred to herein as "synthetic datasets" since at least a portion of each generated dataset includes data that has been synthesized or generated using one or more data generation techniques.

There are various ways in which synthetic datasets may be generated by data catalog system 120. As one example, for a particular original enterprise dataset, data catalog system 120 may determine that the particular original dataset has portions of data that are missing (e.g., it may identify holes or gaps in the original dataset). For example, if the dataset is in the form of a table comprising rows and columns, upon introspecting the original dataset and/or based upon the metadata associated with the original dataset, data catalog system 120 may determine that data in certain cells of the table is missing (e.g., data in certain cells of a particular column of a table is missing). Data catalog system 120 may then use one or more synthetic data generation techniques to generate the missing data. In certain implementations, the missing data may be imputed based upon the original dataset and its associated metadata. Data catalog system 120 may then make a copy of the original enterprise dataset (the one with the missing data) and then, in the copy, fill in the missing gaps with the synthetically generated data. The newly generated synthetic dataset thus includes the data from the original enterprise dataset along with the synthetically generated data for the missing data. The new dataset with the missing data filled in represents a new synthetic dataset that is generated from the original enterprise dataset.

As another example, for a particular original enterprise dataset cataloged by data catalog system 120, data catalog system 120 may determine that portions of data in the particular dataset is restricted data. For example, the restricted data may correspond to personal identifiable information (PII) (e.g., social security numbers, passwords, etc.), data that is restricted by laws or regulations (e.g., data that is restricted under General Data Protection Regulation (GDPR), which is the latest data privacy and security law instituted in Europe), data that is tagged by the enterprise as being restricted (e.g., marked as confidential data, private data, etc.), and the like. In such scenarios, data catalog system 120 may use one or more synthetic data generation techniques to generate synthetic data corresponding to the restricted data. Data catalog system 120 may then make a copy of the original enterprise dataset and then, in the copy, substitute or replace the restricted data with the synthetically generated fake data. The new dataset containing data from the original dataset but with the restricted data being replaced/substituted by the synthetically generated data represents a newly generated synthetic dataset that is generated from the original enterprise dataset.

As yet another example, data catalog system 120 may generate a new synthetic dataset that includes the original dataset along with new synthetic data that is generated by data catalog system 120 based upon the original dataset, and where a synthetic dataset is generated by including the original dataset that is cataloged and augmenting it with the synthetic data. For example, if the original dataset is in the form of a table comprising rows and columns, upon introspecting the original dataset and/or based upon the metadata associated with the original dataset, data catalog system 120 may generate synthetic for a new column (or new row) to be added to the original dataset. Data catalog system 120 may then use one or more synthetic data generation techniques to generate the data for the cells of the new column (or new row). Data catalog system 120 may then make a copy of the original enterprise dataset and augment it with the new synthetic data. The new synthetic dataset thus includes the original dataset along with the newly generated synthetic data.

As yet another example, for a particular original enterprise dataset cataloged by data catalog system 120, data catalog system 120 may use one or more synthetic data generation techniques to generate a completely new synthetic dataset that retains certain attributes/characteristics from the original enterprise dataset but contains new synthetic data. For example, if the original enterprise dataset is a table of rows and columns, the newly generated synthetic dataset may have the same number of columns and features represented by the columns, but the data values stored in the cells of the table are synthetically generated and different from the corresponding data values in the cells of the original dataset. This newly generated dataset represents a new synthetic dataset that is generated from the original enterprise dataset.

While specific examples of synthetic datasets are described above and in other parts of this disclosure, these are not intended to be limiting. Various combinations of the new data generation techniques may be used to generate various types of synthetic datasets. For example, a new synthetic dataset may be generated by filling in missing data in the original dataset and also by replacing the restricted data in the original dataset with fake synthetically generated data. A synthetic dataset may be generated based upon a single original enterprise dataset or based upon multiple original datasets. One or multiple different synthetic datasets may be generated by data catalog system 120 for a single original dataset.

For each synthetic dataset, at least a portion of the data in the dataset is synthetically generated by data catalog system 120. Data catalog system 120 may use various different data generation techniques to generate the synthetic data that is used to build the synthetic datasets. These techniques may include one or more machine-learning (ML) techniques, rules-based techniques, and others. In certain implementations, one or more machine-learning-based techniques may be used. For example, Generative Adversarial Networks (GANs) may be used to generate the synthetic data in the synthetic datasets, where the generated synthetic data closely resembles the original or real data. An example of a GAN architecture has been described in "Ian J. Goodfellow et al., *Generative Adversarial Nets*, NIPS'14: Proceedings of the 27th International Conference on Neural Information Processing Systems, Volume 2, December 2014, pp. 2672-2680." The entire contents of the Goodfellow et al. publication are incorporated herein by reference for all purposes.

A GAN is capable of generating synthetic data based upon real data that is provided as input to the GAN. The synthetic data generated by a GAN mimics the real data in terms of essential parameters, univariate and multivariate distribution, cross-relations between the variables, and so on. During training, a GAN learns the true data distribution of the input training dataset with a view to generating new data points from this distribution with some variations and not just reproducing the old data the model has been trained on. In certain use cases, the synthetic data generated by a GAN can be used to augment the real data to produce synthetic datasets.

A typical GAN architecture consists of two adversarial models generally implemented as neural networks that compete with each other. These adversarial models include a generator neural network (generator) and a discriminator neural network (discriminator). The generator is trained to generate new synthetic data based upon real data provided as input to the generator. The discriminator is a type of classifier that is trained to differentiate between real data or synthetic data by estimating a probability that a sample generated by the generator is real data or generated data. During the training of a GAN, the generator and discriminator play a continuous adversarial game, as a result of which, as the training progresses, the generator learns to produce more realistic data samples based upon the input training data, and the discriminator learns to get better at distinguishing the generated synthetic data from the real data. This adversarial cooperation between the two networks is responsible for the success of the GAN, where they both learn at the expense of one another and attain an equilibrium over time.

A trained GAN can then be used to generate synthetic data for data provided as input to the GAN. A GAN, for example, may be used to generate the various synthetic datasets described in the disclosure. There are different GAN architectures for generating different types of synthetic data, including architectures for generating synthetic tabular data.

Other machine-learning-based techniques, other than GANs, may also be used to generate the synthetic datasets described in this disclosure. These techniques may include the use of neural networks (e.g., convolutional neural networks (CNNs)), Variational Autoencoders (VAEs), decision trees, random forest techniques, linear regression, other deep learning techniques, and others.

Additionally, non-machine-learning based techniques may also be used in addition to or instead of machine-learning-based techniques to generate synthetic datasets. These include, for example, various sampling and best-fit techniques, Monte Carlo techniques, and others.

The synthetic datasets may be used for various purposes. For example, the synthetic datasets may be used by data scientists for training and building machine-learning (ML) models. The synthetic datasets generated by the data catalog system provide ideal candidates for training ML models. By generating multiple synthetic datasets automatically, the data catalog system enables a vast amount of diverse training data to be made available for use by data scientists. The diversity of the synthetic dataset that is generated enables it to be used for training models for various different applications. Further, the inclusion of the synthetic data in the synthetic datasets makes the synthetic datasets better training data candidates than their corresponding original datasets, thus improving the accuracy and performance of the models trained using the synthetic datasets.

A synthetic dataset may be used for experimental purposes by both internal and/or external entities. In an example of internal entity use, a member of an organization, such as a data scientist employed by the organization, may generate synthetic datasets from an original training dataset owned by the organization to test a trained machine learning model. The generated synthetic datasets may comprise at least one new synthetic data portion or attribute not present in the original training dataset. For example, the synthetic dataset may be input to a trained machine learning model to test the accuracy of a corresponding prediction output by the trained machine learning model when the model processes the new synthetic data attribute. Synthetic datasets may also be used by entities outside an organization. For example, a customer of an organization may request a training dataset for training a customer-owned machine learning model. It may be determined that the training dataset sought by the customer contains potentially sensitive information. One or more synthetic datasets may instead be responsively generated from the sought training data and sent to the customer in lieu of the training dataset.

In addition to generating synthetic datasets, data catalog system 120 is configured to generate a data catalog for the synthetic datasets. For purposes of clarity, a data catalog generated by data catalog system 120 for a customer for the customer's original datasets is referred to as the original data catalog or original catalog information, and a data catalog generated by data catalog system 120 for synthetic datasets that have been generated based upon the customer's original datasets is referred to as a synthetic data catalog or synthetic catalog information. The synthetic data catalog enables users to quickly find and access the synthetic datasets generated by data catalog system 120.

In some instances, data catalog system 120 may generate a single synthetic data catalog for a customer, wherein the single synthetic data catalog stores information for all the synthetic datasets that have been generated by data catalog system 120 based upon the customer's original datasets that are cataloged by data catalog system 120. In some other instances, data catalog system 120 may generate multiple synthetic data catalogs for a customer, each synthetic data catalog containing information related to a subset of the synthetic datasets generated based upon the customer's original datasets.

In certain embodiments, a synthetic data catalog is generated by data catalog system 120 in a manner that is similar to generating a original data catalog. A synthetic data catalog generated for a set of synthetic datasets may contain, for each synthetic dataset, information about the data stored by the synthetic dataset. A synthetic data catalog may include information that reflects metadata associated with the synthetic datasets. As described above, the metadata may include various different types of metadata such as technical metadata, business metadata, operational metadata, and other types of metadata. By including information reflecting the metadata of the synthetic datasets in the synthetic data catalog, the synthetic data catalog is made searchable to enable users to find synthetic datasets that meet user specified search criteria. For example, users may query the synthetic data catalog with certain criterion (or criteria) and information identifying the synthetic dataset that meet the criterion (criteria) may be output to the user. The user can then decide to access one or more of the synthetic datasets returned in the search results.

The synthetic data catalog may identify which portions of the dataset include synthetically generated data, and provide a profile (e.g., usage statistics) of the synthetic dataset. This synthetic data catalog enables users to easily find the synthetic datasets and also to find out information related to the synthetic datasets.

In certain implementations, the information stored in a synthetic data catalog for a synthetic dataset may include information indicative of the original enterprise dataset (or datasets) that was used to generate that synthetic dataset. This way, the synthetic data catalog may include lineage information tracing a line from a synthetic dataset to the original dataset that was used to generate that new dataset. For a synthetic dataset, the synthetic data catalog may also include information that can be used to not only access the synthetic dataset but also the original dataset that was used to generate the synthetic dataset. For example, for a synthetic dataset, a reference or link to the original enterprise dataset used to generate that synthetic dataset may be stored in the synthetic data catalog that contains information for the synthetic dataset. This reference or link enables a user to easily identify the original dataset that was used to generate the new dataset and may enable the user to access that original dataset.

In certain implementations, the catalog information stored in the synthetic data catalog for a synthetic dataset may identify which portions of the synthetic dataset are copied from the original dataset and which portions are synthetically generated. This information may be useful to users of the synthetic datasets. Additionally, synthetic data can be generated for any original data sets that an organization does not intend to release or share with other entities. For example, an organization may generate an original dataset containing proprietary information relating to the activities of the organization. The dataset may be valuable for various uses, such as for training external models, but release of the original dataset would compromise the proprietary information and thus the organization may not want this dataset private. In lieu of the original dataset, a synthetic dataset may be generated which comprises a similar data structure and data attributes as the original dataset but which replaces the original proprietary data values with non-proprietary synthetic data. The resulting synthetic dataset mimics the original dataset but does not compromise the proprietary information of the original dataset. This synthetic dataset can then be made available for a variety of uses such as for training ML models.

Data catalog system 120 also updates the original data catalog generated for the original datasets to include information related to the synthetic datasets that have been generated based upon one or more of the original datasets. For example, for a particular original dataset that was used by data catalog system 120 to generate a synthetic dataset, the catalog information in the original data catalog may be updated by data catalog system 120 to identify the synthetic dataset. This enables users accessing the original data catalog to, for an original dataset, have knowledge of any synthetic datasets that have been generated based upon that original dataset.

Data catalog system 120 generates various data assets in the form of original data catalogs, synthetic datasets, and synthetic data catalogs. Data catalog system 120 provides various mechanisms that enable a user to access these generated data assets. As shown in FIG. 1, users may access information generated by data catalog system 120, including various catalogs and synthetic datasets, via one or more client devices 190(1) . . . 190(n). In certain implementations, data catalog system 120 may provide user interfaces (e.g., provided by user interface subsystem 170 of data catalog system 120) that enable users to interact with data catalog system 120 (e.g., provide inputs to data catalog system 120 and receive outputs provided by data catalog system 120). These interfaces may be in the form of graphical user interfaces (GUIs), which may be displayed by client devices 190 used by the users, application programmer interfaces (APIs) such as REST APIs that are callable by users, command line options, and the like.

Data catalog system 120 is configured to control or regulate access to the catalogs and synthetic datasets generated by data catalog system 120. The access to these resources may be based upon policies configured for data catalog system 120. For example, in the embodiment depicted in FIG. 1, data catalog system 120 includes an access management subsystem 150 that is configured to control access to the catalogs and synthetic datasets generated by data catalog system 120 based upon one or more policies 160. Policies 160 may specify rules that specify which datasets and catalogs can be accessed by which users and under what conditions. In certain embodiments, policies 160 may be configured by an administrator of data catalog system 120. Data catalog system 120 thus provides a layer of governance that controls access to the catalogs and to the synthetic datasets.

The original data catalog(s) generated by data catalog system 120 for a customer provide a comprehensive view of original datasets of the customer. The synthetic data catalog(s) generated for a customer provide a view of the synthetic datasets that are generated based upon the customer's original datasets. In some embodiments, customers can provide or use their own proprietary algorithms for synthetic data generation. For example, a customer may specify a number of rules or patterns for synthetic data generation, such as a rule that all calendar date information is presented in a "Year-Month-Date" format or all proper nouns are capitalized, etc. The data catalogs can be used to easily find and access the original and/or the synthetic datasets. Further, by providing access control mechanisms, data catalog system 120 also provides data governance capabilities governing who can access the catalogs and the datasets. Data catalog system 120 may provide cataloging and synthetic datasets generation services for one or more customers.

Data catalog system 120 may be implemented using multiple subsystems, which work together to provide the various functionalities provided by data catalog system 120. The subsystems and other components of data catalog system 120 depicted in FIG. 1 may be implemented in software (e.g., code, instructions, program) executed by one or more processing units (e.g., processors, cores), using hardware, or combinations thereof. The software may be stored on a non-transitory storage medium (e.g., on a memory device or disk). In the embodiment depicted in FIG. 1, the subsystems include a data access subsystem 121, a metadata harvester subsystem 122, a catalog generator subsystem 123, a synthetic dataset generator subsystem 124, an access management subsystem 150, a UI subsystem 170, and a profiler subsystem 180. Data catalog system 120 depicted in FIG. 1 is merely an example and is not intended to unduly limit the scope of claimed embodiments. Many variations, alternatives, and modifications are possible. For example, in some implementations, data catalog system 120 may have more or fewer components than those shown in FIG. 1, may combine two or more components, or may have a different configuration or arrangement of components.

Data used, stored, or generated by data catalog system 120 may be stored in a data store 130, which may be implemented as a non-volatile memory store. Data source 101(1) may be a single data source, or in other implementations, may be distributed in nature with data source 101(n) representing a collection of different data sources that may be communicatively coupled to data catalog system 120.

In certain implementations, data access subsystem 121 is configured to search for and access the original enterprise datasets to be cataloged. In certain scenarios, a customer subscribing to cloud services offered by data catalog system 120 may identify specific datasets to be cataloged, and data access subsystem 121 is configured to locate and access the specified datasets from their data sources. In some other scenarios, a customer may identify one or more data sources, and data access subsystem 121 may then crawl these data sources and discover the datasets stored by those data sources that are to be cataloged. Data access subsystem 121 may provide information related to the original datasets to be cataloged to metadata harvester subsystem 122, catalog generator subsystem 123, and synthetic dataset generator subsystem 124.

Metadata harvester subsystem 122 may be configured to locate and harvest metadata corresponding to the original datasets to be cataloged and also synthetic datasets generated by data catalog system 120. For example, if original dataset 102(1)(a) in FIG. 1 is to be cataloged, metadata harvester subsystem 122 accesses and processes metadata 103(1)(a) corresponding to dataset 102(1)(a). In certain instances, data harvester subsystem 122 may also determine the metadata for original dataset 102(1) by introspecting that dataset. Metadata harvester subsystem 122 is also configured to harvest metadata for synthetic datasets generated by data catalog system 120. Metadata harvester subsystem 122 may provide the harvested metadata for an original dataset to catalog generator subsystem 123 to enable it to generate/update the original data catalog storing information for the original dataset and to synthetic dataset generator subsystem 124 to enable it to generate synthetic datasets. Metadata harvester subsystem 122 may provide the harvested metadata for a synthetic dataset to catalog generator subsystem 123 to enable it to generate/update the synthetic data catalog storing information for the synthetic dataset.

Synthetic dataset generator subsystem 124 is configured to generate synthetic datasets for one or more customers based upon the original datasets of the customers. The synthetic datasets generated by data catalog system 120 may be stored in data store 130. Synthetic dataset generator 124 may use various different techniques to generate synthetic datasets. For example, as described above, a new synthetic dataset may be generated by making a copy of an original dataset and filling in data missing in the original dataset with synthetically generated data. A new synthetic dataset may be generated by making a copy of an original dataset and substituting/replacing restricted data in the original dataset with synthetically generated data. As another example, a new synthetic dataset may be generated by generating synthetic data based upon the original dataset.

Various different techniques may be used by synthetic dataset generator subsystem 124 for generating the synthetic data in the synthetic datasets. These techniques may include one or more machine-learning (ML) techniques. For example, generative adversarial networks (GANs), Variational Auto Encoders (VAEs), and/or any other ML-based structures may be used to implement the techniques described herein. Synthetic dataset generator subsystem 124 may provide information regarding newly generated synthetic datasets to metadata harvester subsystem 122 to enable it to harvest metadata for the synthetic dataset and to catalog generator subsystem 123 to enable it to generate/update information stored in the synthetic data catalog for the generated synthetic datasets.

Catalog generator subsystem 123 is configured to generate and/or update original catalogs for one or more customers. An original data catalog generated by catalog generator subsystem 123 for a customer may store information related to the original datasets for the customer that are accessed by data access subsystem 121. The original data catalog may also include information regarding metadata corresponding to the original datasets that is received from metadata harvester subsystem 122. The original data catalogs generated by catalog generator subsystem 123 for one or more customers may be stored in data store 130. After an original data catalog has been generated for a customer, as additional datasets are cataloged for that customer, the original data catalog is updated by catalog generator subsystem 123 for those additional original datasets.

Catalog generator subsystem 123 is also configured to generate and/or update synthetic data catalogs for customers for synthetic datasets generated by data catalog system 120. A synthetic data catalog generated by catalog generator subsystem 123 for a customer may store information related to the synthetic datasets generated for the customer. Information regarding these synthetic datasets may be received by catalog generator subsystem 123 from synthetic dataset generator subsystem 124. The synthetic data catalog may also include information regarding metadata corresponding to the synthetic datasets that is received from metadata harvester subsystem 122. The synthetic data catalogs generated by catalog generator subsystem 123 for one or more customers may be stored in data store 130. After a synthetic data catalog has been generated for a customer, as additional synthetic datasets are generated by data catalog system 120 based upon the customer's original datasets, the synthetic data catalog for that customer is updated by catalog generator subsystem 123 for the newly generated synthetic datasets.

A synthetic data catalog also includes information related to the original dataset that was the basis for generation of the synthetic dataset. This information enables a user to easily identify the original dataset that was used to generate the synthetic dataset and also enables the user to access that original dataset, if so desired by the user. The synthetic data catalogs generated by catalog generator subsystem 123 for one or more customers may be stored in data store 130. After a synthetic data catalog has been generated for a customer, as additional synthetic datasets are generated by data catalog system 120 for that customer, the synthetic data catalog is updated for those additional synthetic datasets.

When a synthetic dataset is generated for an original dataset, the catalog generator subsystem 123 is also responsible for updating the catalog information for that original dataset in the original data catalog to include information about the synthetic dataset. This enables users accessing the original data catalog to, for an original dataset, have knowledge of any synthetic datasets that have been generated based upon that original dataset.

UI subsystem 170 provides an interface that allows users to interact with data catalog system 120. Users may provide inputs to data catalog system 120 and receive information from data catalog system 120 via UI subsystem 170. For example, user may interact with data catalog system 120 using one or more client devices 190(1) . . . 190(n). In order to facilitate these interactions, UI subsystem 170 may provide graphical user interfaces (GUIs), which may be displayed by client devices 190 used by the users, application programmer interfaces (APIs) such as REST APIs that are callable by users, command line options, and the like. In certain embodiments, UI subsystem 170 may also provide capabilities that enable a user to input metadata for an original dataset and/or a synthetic dataset.

Access management subsystem 150 is responsible for regulating or controlling access to the various datasets and catalogs, including original data catalogs and synthetic data catalogs, generated by data catalog system 120. The access control may be based upon one or more policies 160 configured for the various datasets and data catalogs. Policies 160 may specify policies or rules that indicate which datasets and catalogs can be accessed by which users under what conditions. In certain embodiments, policies 160 may be configured by an administrator of data catalog system 120. Access management subsystem 150 thus provides a governance layer that controls access to the data catalogs and synthetic datasets.

Profiler subsystem 180 is responsible for profiling the original datasets and the synthetic datasets. Profiler subsystem 180 uses various data profiling techniques to analyze the content, quality and structure of the datasets and provide insights into the data. For example, profiler subsystem 180 may provide insights into various column and row level statistics, detect patterns, anomalies, and relationships in the data. The profiling may be performed on a continuous basis as new original datasets are cataloged and new synthetic datasets are created. Various different types of profiling may be performed by profiler subsystem 180 including attribute profiling, structural profiling, and schema profiling. Attribute profiling may include profiling information about min/max/average values for a column with numeric datatypes, min/max/average lengths for columns with string data types, mean, median, standard deviation, frequency distribution, distinct counts, nulls, data types, patterns, domains, etc. Structural profiling may determine information about attribute counts (e.g., number of columns in a dataset), row counts, candidate/primary keys, functional dependencies, record classifications, etc. Schema profiling may determine information about overlap analysis (e.g., determine columns that contain the same data), join conditions, primary key-foreign key (PK-FK) relationships discovery, and the like.

At a high level, data profiling is the process of examining the data available from a dataset and collecting statistics or informative summaries about that data. Data profiling helps an enterprise to: make accurate assessments about data content rather than making assumptions (e.g., ensure that the primary column(s) of a table does not have any null or empty values); validate business semantics of the source (e.g., if a column in a particular source is to contain business phone numbers, then profiling can validate if the column contains proper and valid numbers); and verify data quality reports by comparing the report numbers with profiling results.

Profiler subsystem 180 may use different statistical and analytical algorithms in providing insight into the content of the datasets, and qualitative characteristics of those values. For example, for a database, the profiling information generated by profiler subsystem 180 may include information about the size of the database, the number of tables in the database, the number of files in the database, row counts, column attributes, etc. For a table, the profile may include column description, top values in a column, null count of a column, distinct count, maximum value, minimum value and much more.

Examples of data profiling techniques include: attribute level (read Column) profiling, structural profiling (read Table), schema profiling (read Cross Tables), semantic classification, similarity discovery, recommendations (Joins, Keys, Normalization, Relationships), correlation analysis, rules discovery/rule profiling, outlier/anomaly detection, providing data alerts (when a particular rule conformance on data goes below the acceptable thresholds), and the like.

In certain embodiments, the information determined by profiler subsystem 180 about the datasets, including original and synthetic datasets, is used by catalog generator subsystem 123 for building original data catalogs and synthetic data catalogs. Some of the profiled information may be included in the original and synthetic data catalogs.

Figure 2:
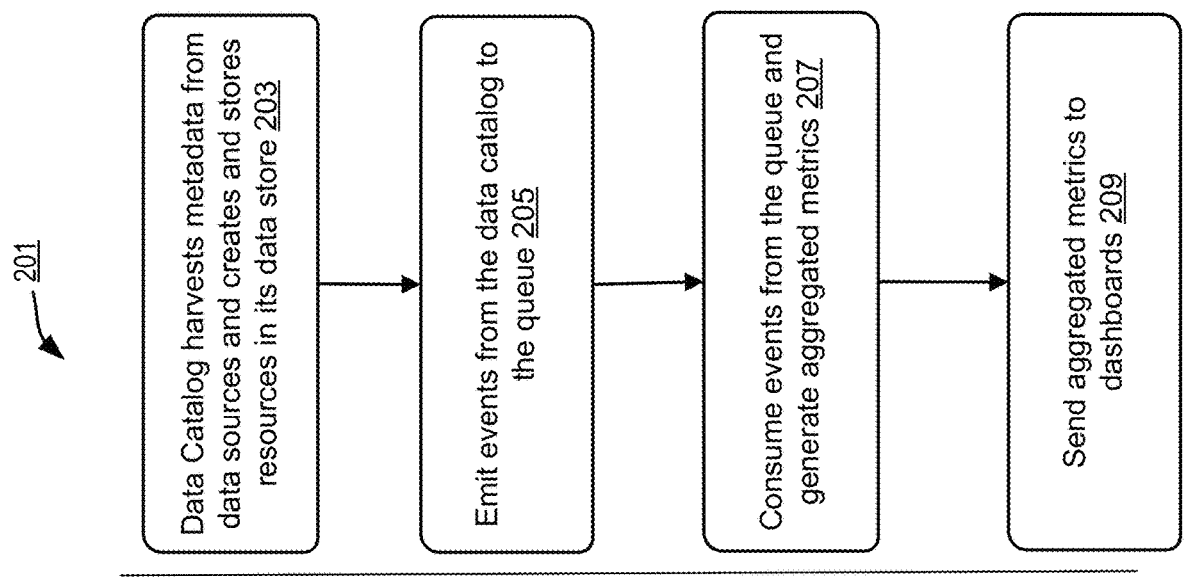
FIG. 2 shows a simplified diagram of a metrics aggregation system and a related process according to some embodiments.
Figure 2:
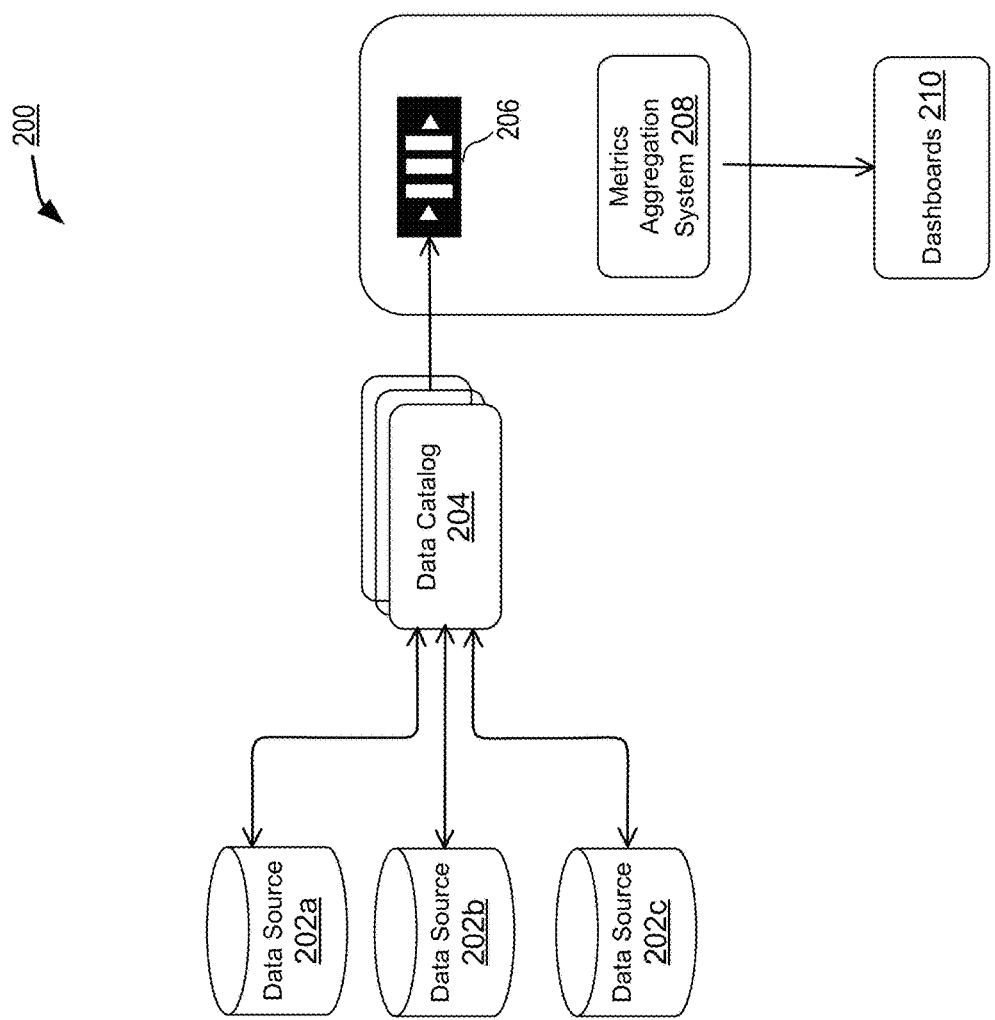

FIG. 2 shows a simplified diagram of a metrics aggregation system 200 and a related process 201 according to some embodiments. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Turning to the process 201 in further detail, at block 203 the data catalog 204 harvests metadata from data sources 202a-202c and creates and stores resources in its data store.

Using the diagram of metrics aggregation system 200 for further illustration, the data sources 202a-202c can include databases, object stores, file stores, document stores, message queues, applications, or the like. The data catalog 204 harvests metadata from data sources 202a-202c and stores the metadata in the data catalog's data store.

At block 205, data catalog 204 identifies changes made at the data sources, such as the creation or deletion of resources, and data catalog 204 emits the changes to the data catalog queue 206. In some implementations, data catalog 204 can identify changes made at the data sources by identifying a first status for an event source. Data catalog 204 can receive an event for an event source and data catalog 204 can create a second status for the event source based at least in part on the event. Data catalog 204 can determine if the event source has been updated at least in part on a comparison of the two statuses.

A resource can be an asset in a data source with each data source having one or more resource types. The one or more resource types can include at least one of: data assets, data entities, filename patterns, logical data entities, attributes, glossaries, categories, terms, data catalog tags, or jobs. Data assets can represent a data source, an object store, a file store, a message queue, or an application. Data entities are a collection of data such as a database table or a single logical file. A filename pattern is a regular expression that is created to group multiple object storage files into a logical data entity. A logical data entity is a group of object storage files that are derived by creating and assigning filename patterns to a data asset. An attribute is a description of a data item with a name and data type (e.g., a column in a table or field in a file). A custom property is a custom resource type that can be created by a customer. A term is an actual definitions of business concepts as agreed upon by different business stakeholders in your company A category is a group of logically related terms and a glossary is a collection of categories and terms. A data catalog tad is a label used to identify data objects and tags help in metadata classification and discovery. A job is a task that runs the harvest process.

At block 207, the metrics aggregation system 208 consumes events from the data catalog queue 206 to generate aggregated metrics. In some embodiments, the events are consumed by one or more workers in metrics aggregation system 208. In some implementations, the catalog queue 206 can be divided into partitions with one or more workers consuming events from each partition. The partitions can be divided by customer ID or the partitions can contain events from multiple customers.

At block 209, the metrics aggregation system sends the aggregated metrics to the dashboards 210. Data catalog customers, such as product managers, can use the dashboard to learn about customer engagement and usage of various product features. The dashboards can contain a number of elements including staging tables to ingest data, intermediate tables for preprocessing data, and graphics, such as graphs or charts, for displaying the data to customers.

Figure 3:
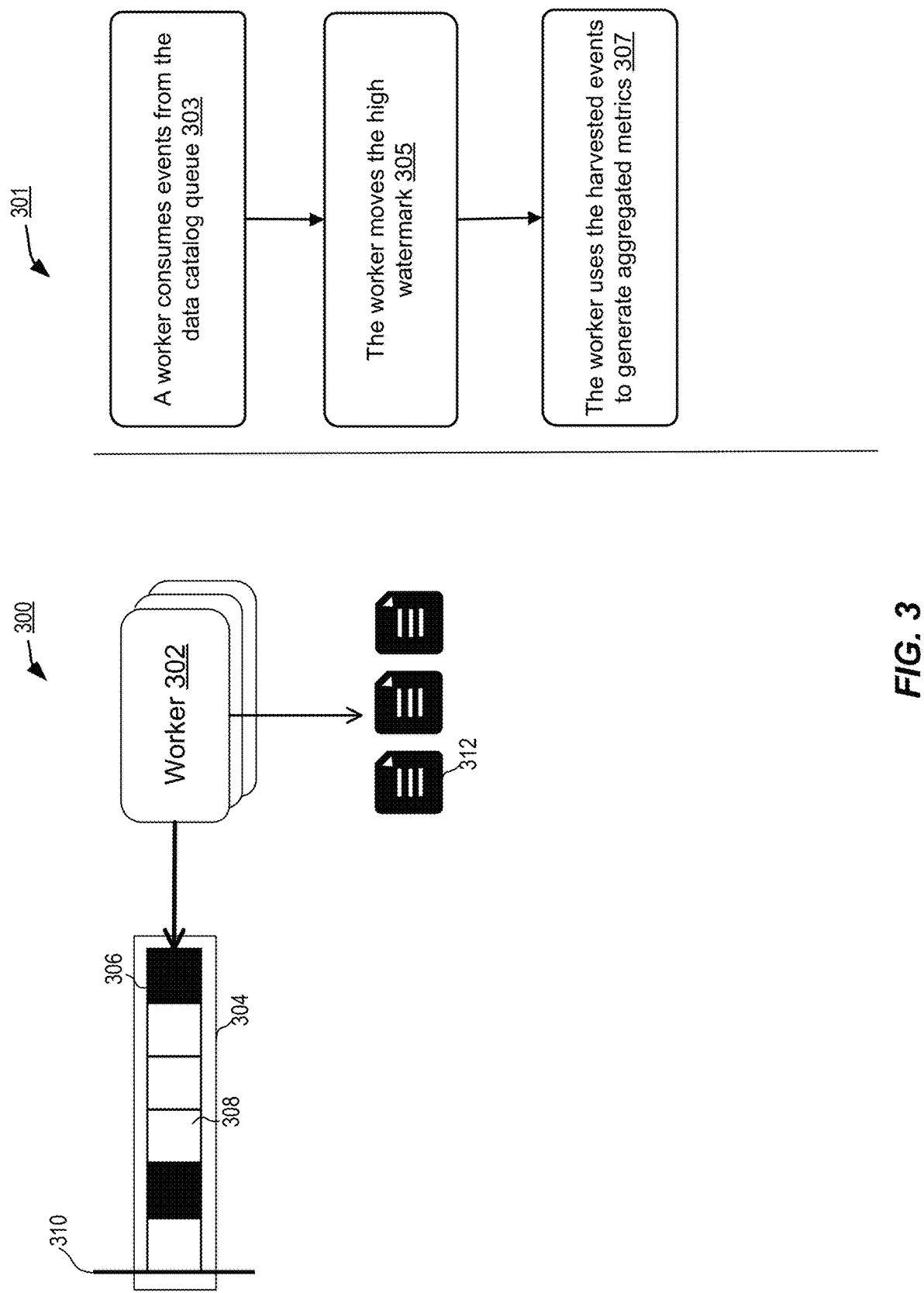
FIG. 3 shows a metrics aggregation system worker consuming events from an event queue and a related process according to some embodiments.

FIG. 3 shows a metrics aggregation system worker consuming events from an event queue 300 and a related process 301 according to some embodiments. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Turning to process 301 in further detail, at block 303, a worker 302 can consume events from the data catalog queue 304. The events can include create events 306 and delete events 308. In a create event, a resource in a data source is created while in a delete event a resource in a data source is deleted. A data source can have one or more resource types and multiple data sources can have the same resource type. A worker can be configured to complete a job (e.g., a task that runs the consuming process). A job can be created and run as needed or the job can be scheduled to run at a specified frequency.

At block 305, worker 302 can move the high watermark 310 to indicate a point separating events in the data catalog queue 304 that have been consumed by a worker and event in the data catalog queue 304 that have not been consumed. The high watermark 310 can be used to coordinate tasks between multiple workers because each worker can consult the high watermark 310 to determine which events from the queue have been consumed. In some implementations, when the data catalog queue 304 contains one or more partitions each partition can contain a separate high watermark 310.

At block 307, the worker can generate aggregated metrics 312 from the consumed events. Generating aggregated metrics can include worker 302 determining the total number of create and delete events for a given resource and producing a net change in the resource. Workers 302 can also run additional business rules to filter and transform events received. For example, worker 302 can determine the client ID (tenant ID) for the events and the worker can annotate the event to indicate whether the customer causing the event is a paying customer or a free-tier customer. Additionally, the worker can determine if the customer creating the event is an external customer or an internal customer. Worker 302 can further process the consumed events to, for example, analyze trends in resource creation. Worker 302 can also generate derived/secondary resource metrics out of the resource counts that are created when the worker consumes events.

Figure 4:
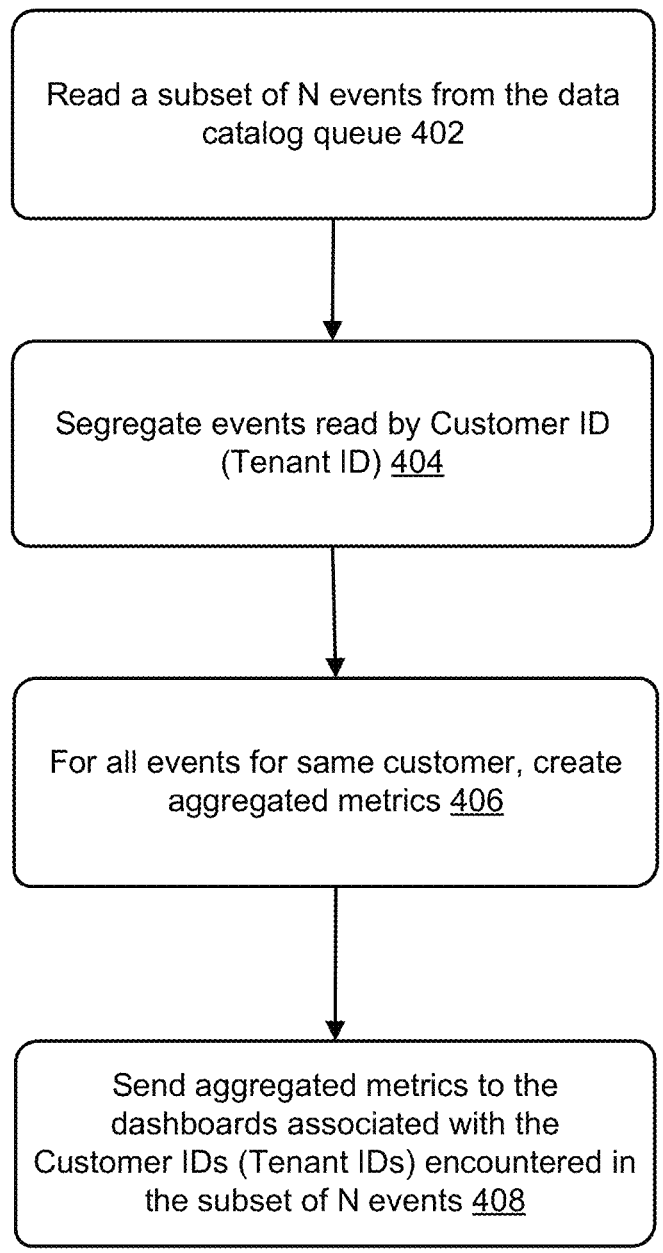
FIG. 4 shows a flowchart of a process for generating metadata aggregated by customer ID from messages in the queue according to some embodiments.

FIG. 4 shows a flowchart of a process for generating metadata aggregated by customer ID from messages in the queue according to some embodiments. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Turning to process 400 in further detail, at block 402, a worker read a subset of N messages (e.g., events) from the data catalog queue. In some implementations, the worker can move the high watermark to indicate a point separating processed events from unprocessed messages. At block 404, the worker can segregate events by customer ID (e.g., tenant ID).

At block 406, the worker can, for all messages for the same tenant, create aggregated resource counts. In some implementations, the events from the same tenant will be identified because the messages share a common customer ID or tenant ID. In some implementations the events, for each tenant, can be stored in separate queue partitions. One or more workers can consume events from each queue, with workers being assigned to consume events from a particular message queue partition. In some implementations, the workers can be assigned to consume events from available queue partitions without the workers being assigned exclusively to a particular queue partition.

At block 408, the worker can send aggregated metrics for each customer ID in the subset of events to dashboards associated with each customer ID. The aggregated metrics can be received at a dashboard staging table before the metrics are forwarded to an intermediate table. At the intermediate table, the data can be processed to generate graphics, such as charts or graphs, that can be presented to product managers or customers.

Figure 5:
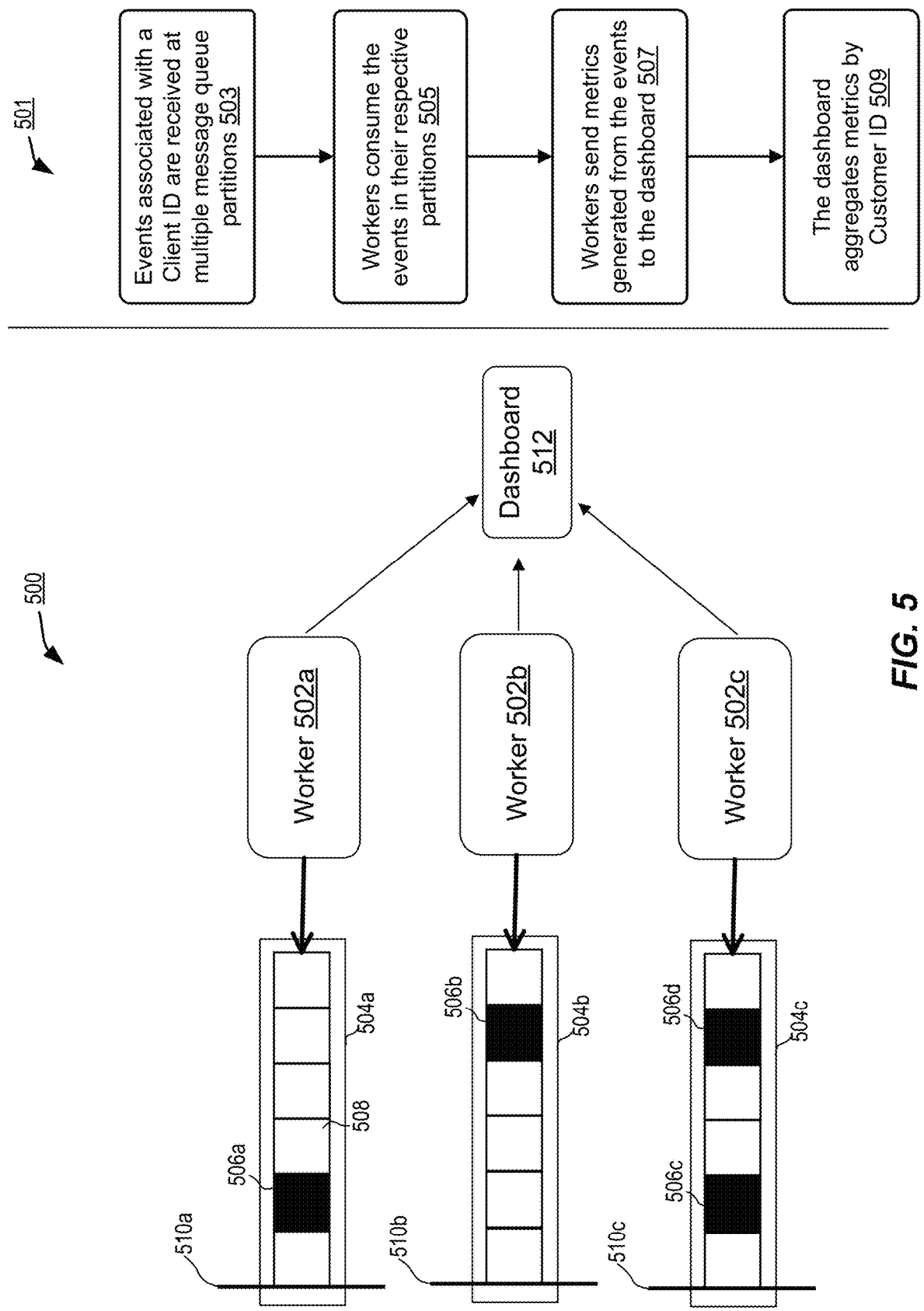
FIG. 5 shows metrics aggregation system workers consuming events from several message queue partitions and a related process according to some embodiments.

FIG. 5 shows metrics aggregation system workers consuming events from several message queue partitions 500 and a related process 501 according to some embodiments. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Turning to the process 501 in greater detail, at block 503, events associated with a Client ID are received at multiple message queue partitions. While events associated with the same customer ID are shown in multiple partitions, in some implementations partitions 504a-504c can be created to contain events associated with a single customer ID. Using diagram 500 for further illustration, the workers 502a-502c can each have a message queue partition 504a-504c where each worker can receive events from a separate partition. Message queue partitions 504a-504c can each contain events 506a-506d associated with a single client ID as well as events associated with other client IDs 508. In some implementations, workers 502a-502c can be assigned to consume events exclusively from a single partition. Conversely, workers 502a-502c can be configured to consume events from multiple partitions as needed. In some implementations, a single worker's subset of events can include events from multiple message queue partitions.

At block 505 workers 502a-502c can each consume events from their respective partitions 504a-504c. In some implementations, the workers can move the message queue partitions' high watermarks 510a-510c to indicate points separating consumed events from unconsumed events. In implementations where multiple workers consume events from the same partition, the high watermark can help ensure that the workers know what events have been consumed by another worker.

At block 507, the workers 502a-502c can send metrics generated by workers 502a-502c using the events to the dashboard 512. The metrics sent to dashboard 512 include the client ID for each event that was used to generate the metrics. The metrics can be received at a staging table within dashboard 512. Before producing aggregated metrics, the metrics stored in the dashboard staging table can be forwarded to an intermediate table for processing. Dashboard 512 can use the client IDs for the received metrics to generate aggregated metrics for the client associated with the client ID. For example, the events in message queue partitions 504a-504f can include four create events 506a-506d associated with a client ID. Create events 506a-506c can be three create data asset events for a single client ID and create event 506d can be a create glossary event associated with the client ID. When workers 502a-502c send metrics to dashboard 512, the aggregated metrics prepared by dashboard 512 can show that the data asset count for the client ID increased by three while the glossary for the client ID increased by one. The aggregated metrics can be used to produce graphics that can be presented to customers through the dashboard.

Figure 6:
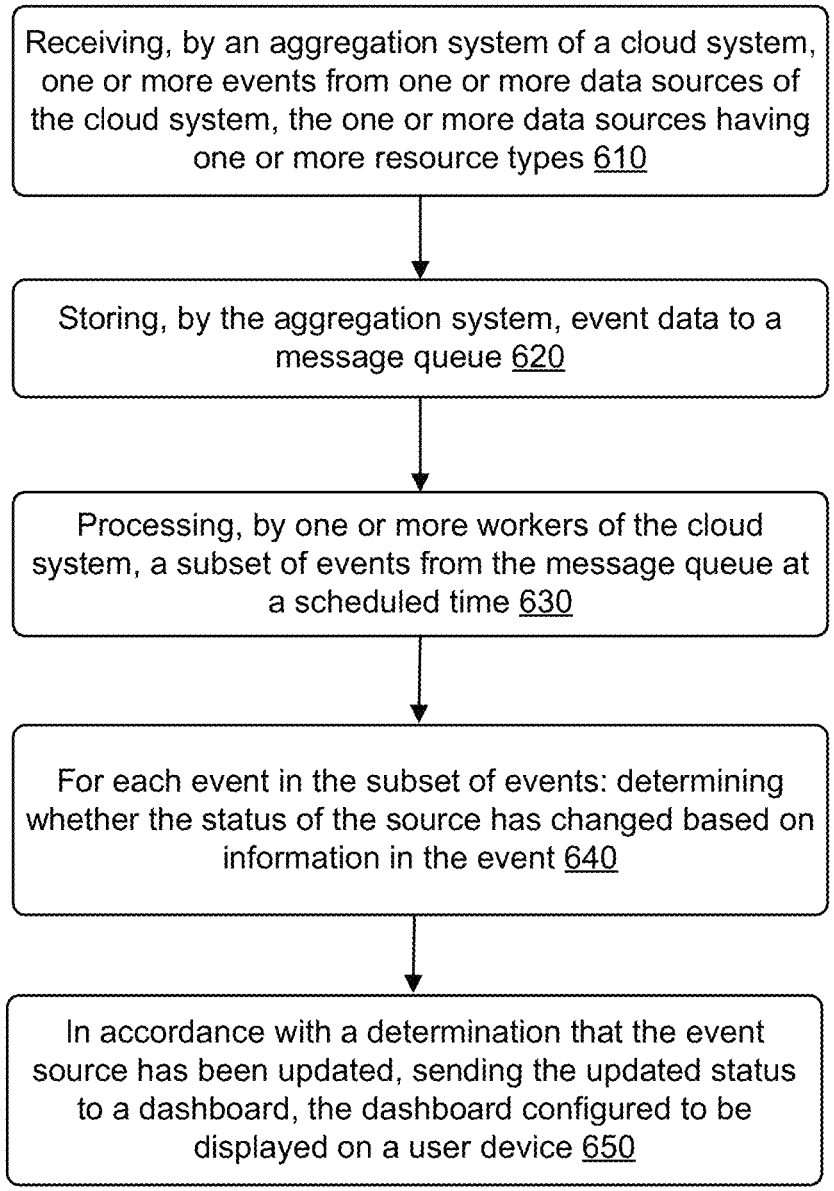
FIG. 6 shows a method for generating resource count metrics for a cloud-based data catalog service according to some embodiments.

FIG. 6 depicts a method for generating resource count metrics for a cloud-based data catalog service according to some embodiments.

Turning to the process 600 in further detail, at block 610, a computer-implemented method can include receiving one or more events from one or more data sources of the cloud system. The events can be received by an aggregation system of a cloud system and the one or more data sources can have one or more resource types. The one or more resource types can include at least one of: data assets, data entities, filename patterns, logical data entities, attributes, glossaries, categories, terms, data catalog tags, or jobs. Data assets or data sources can represent a data source, an object store, a file store, a message queue, or an application. A data source is a potential source for harvested data and, by convention, once a data source is configured for harvest in a data catalog the data source is referred to as a data asset. Data entities are a collection of data such as a database table or a single logical file. A filename pattern is a regular expression that is created to group multiple object storage files into a logical data entity. A logical data entity is a group of object storage files that are derived by creating and assigning filename patterns to a data asset. An attribute is a description of a data item with a name and data type (e.g., a column in a table or field in a file). A custom property is a custom resource type that can be created by a customer and a custom property enrich data catalog objects with business context. A term is an actual definition of business concepts as agreed upon by different business stakeholders in your company A category is a group of logically related terms and a glossary is a collection of categories and terms. A data catalog tad is a label used to identify data objects and tags help in metadata classification and discovery. A job, or harvest job, is a task that runs the harvest process.

At block 620, the method includes storing, by the aggregation system, event data to a message queue. Event data can include create events, for the creation of a resource in a data source, and delete events, for the deletion of a resource in a data source. Event data can be harvested from data sources by the data catalog, and the data catalog can store the events in a data store. Events in the data catalog's data store can be emitted from the data store to the metrics aggregation system according to a set schedule, when the number of new events in the data store exceeds a threshold, or the events can be emitted as changes to the events occur.

At block 630, the method includes, processing, by one or more workers of the cloud system, a subset of events from the message queue at a scheduled time. The message queue can comprise a common queue for events from the one or more data sources and the one or more resource types in a common queue. In some embodiments, one or more workers can receive a subset of common queue events from the message queue. The message queue can also include partitions where a partition contains events associated with a single client ID. The message queue partitions can also contain events for a particular worker.

At block 640, the method includes, for each event in the subset of events: determining whether an event source has been updated based on information in the event. The determination of the change in status can be made by the data catalog before events are emitted to the queue.

At block 650, the method includes, in accordance with a determination that the event source has been updated, sending the updated status to a dashboard, the dashboard configured to be displayed on a user device. The updated status can be sent to the dashboard by one or more workers. The dashboard can receive the updated status at a staging table before the updated status is forwarded to an intermediate table for processing. The intermediate table can be used to generate graphics that can be shown to customers through the dashboard.

In some implementations, the method can further include: indicating, via a high watermark, a point in the message queue separating processed events from unprocessed events. The method can also include, updating the high watermark in response to a worker processing the subset of events in the message queue. In implementations where the message queue is divided into multiple partitions, each partition can contain a separate high watermark.

In some implementations, the method can further include: receiving, by the aggregation system, an event from a data source with a new resource type without the aggregation system being reconfigured.

In some implementations, the method can further include: separating into one or more customer subsets before processing, where a customer subset comprises events associated with one tenant identifier (tenant ID). In some implementations, the message queue can have several partitions with one or more partitions for each customer subset.

In some implementations, the method includes, for each event in the subset of events: identifying, by the data catalog, an event source with a first status. The method can also include creating, by the data catalog, a second status for the event source based at least in part on the event. The method can also include determining, by the data catalog, whether the event source has been updated at least in part on a comparison of the first status and the second status. A comparison of the first status and second status can be used to determine if an event source has been created or deleted. In some implementations, the event source can be a resource within a data source.

The event status (e.g., first status or second status) can refer to a condition for the event source and the event statuses can be used to determine if an event source has been updated. For example, an event source can have a first status indicating a first record for the event source, and a second status indicating that the record no longer exists. Based on a comparison between the first status and the second status, the data catalog can determine that the event source has been deleted and the data catalog can emit an event to the queue.

Figure 7:
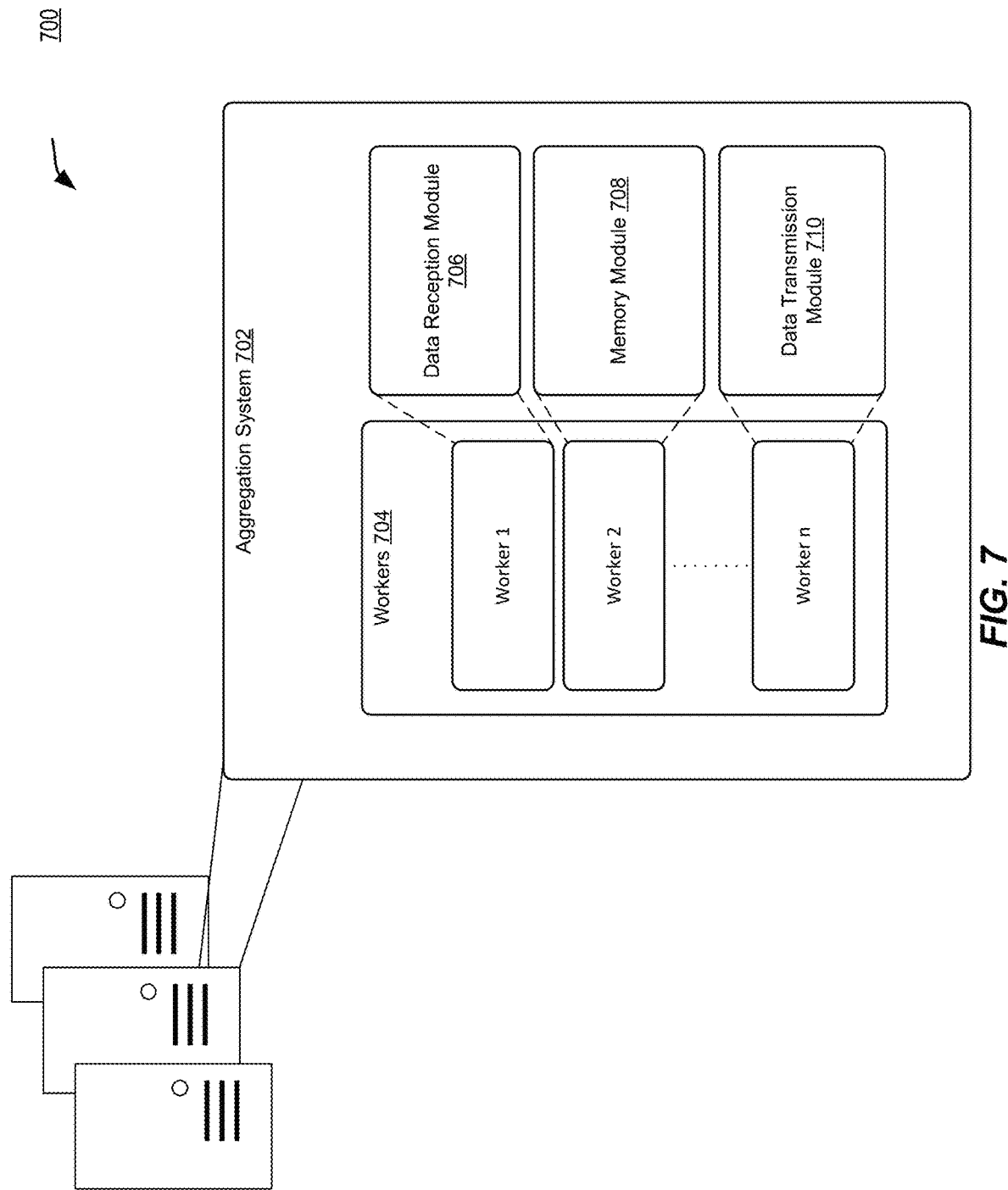
FIG. 7 shows a system architecture depicting an aggregation system according to some embodiments.

FIG. 7 shows a system architecture for an aggregation system according to some embodiments. The cloud-based aggregation system 702 can be hosted on servers 700a-700b. The aggregation system can include a data reception module 706 that can receive one or more events from one or more data sources of the cloud system. The aggregation system also can include a memory module 708 that can store event data in a message queue. Memory module 708 can indicate, via a high watermark, a point in the message queue separating processed events from unprocessed events. The queue can be stored in memory module 708 and workers 704 can update the high water mark in the queue based on information stored in memory module 708. In some implementations, memory module 708 can also update the high watermark in response to a worker processing the subset of events in the message queue. In some implementations, the memory module can temporarily store events read from the queue and the queue can be stored outside of the aggregation system.

The aggregation system can also include one or more workers 704 that can process a subset of events from the message queue. The workers 704 can process the events as they occur, when the events in the queue exceed a threshold, or at a scheduled time. In some implementations, workers 704 can contain a version of one or more of data reception module 706, memory module 708, or data transmission module 710. In some implementations, data reception module 706, memory module 708, or data transmission module 710 can be separate components within the aggregation system. Workers 704 can, for each event in the subset of events, identify an event source with a first status. Workers 704 can also, for each event in the subset of events, create an updated status for the event source based at least in part on the event. Workers 704 can also, for each event in the subset of events, determine whether the event source has been updated based at least in part on a comparison of the first status and the updated status. The aggregation system can also include a data transmission module 710 that can, in accordance with a determination that the event source has been updated, send the updated status to a dashboard, the dashboard configured to be displayed on a user device.

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The virtual or overlay networks can include one or more virtual cloud networks (VCNs). The virtual networks are implemented using software virtualization technologies (e.g., hypervisors, functions performed by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VXLAN—IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual networks. Both the physical IP addresses and overlay IP addresses are types of real IP addresses. These are separate from virtual IP addresses, where a virtual IP address maps to multiple real IP addresses. A virtual IP address provides a 1-to-many mapping between the virtual IP address and multiple real IP addresses.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in an virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premise networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with public accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general. a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about: the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP) and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 13, 1414, 15, and 16 (see references 1316, 141416, 1516, and 1616) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Figure 8:
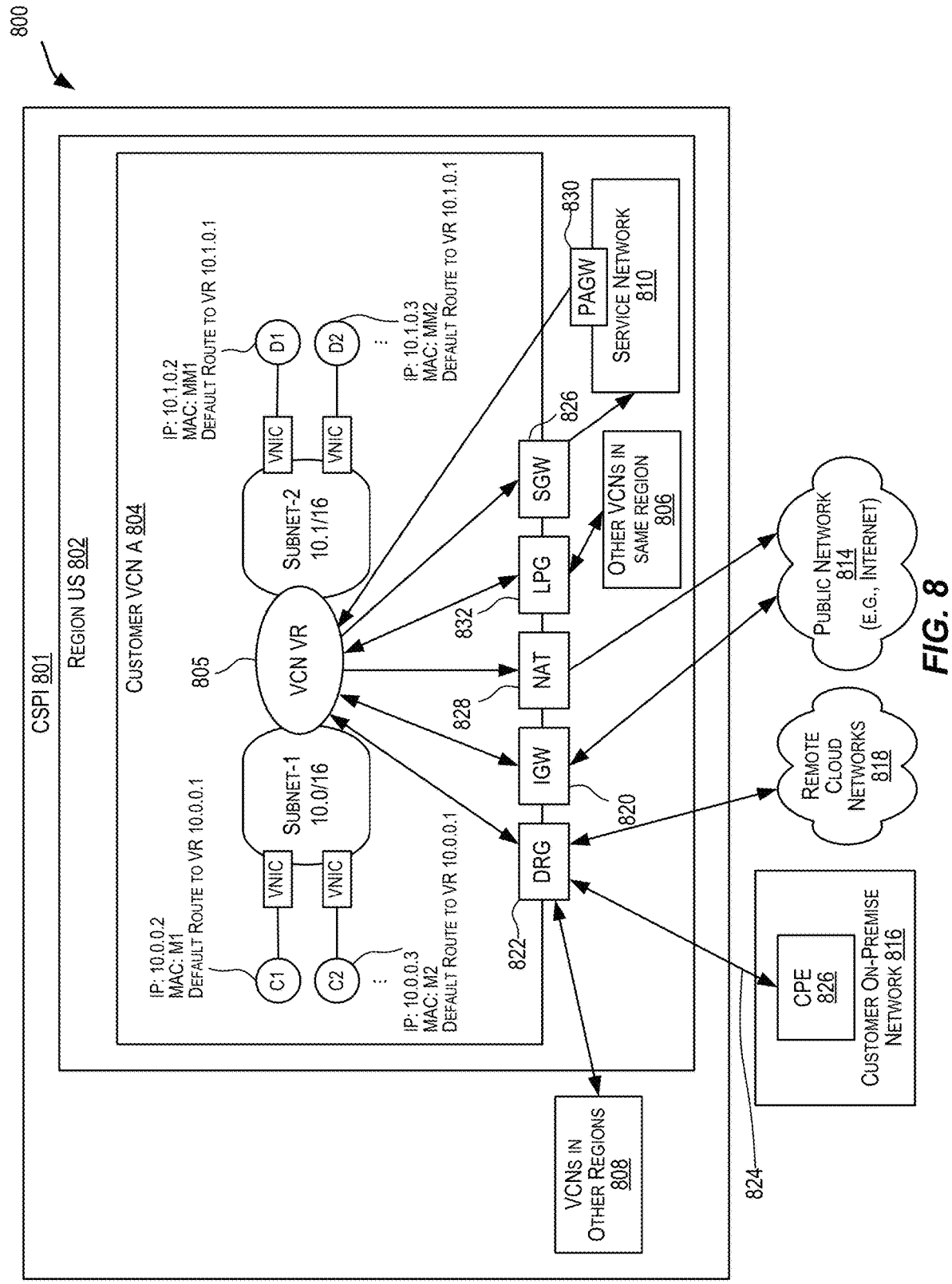
FIG. 8 is a high level diagram of a distributed environment showing a virtual or overlay cloud network hosted by a cloud service provider infrastructure according to certain embodiments.

Various different architectures for implementing cloud-based service using CSPI are depicted in FIGS. 8, 9, 10, 11, 12, 13, 14, 15, and 17, and are described below. FIG. 8 is a high level diagram of a distributed environment 800 showing an overlay or customer VCN hosted by CSPI according to certain embodiments. The distributed environment depicted in FIG. 8 includes multiple components in the overlay network. Distributed environment 800 depicted in FIG. 8 is merely an example and is not intended to unduly limit the scope of claimed embodiments. Many variations, alternatives, and modifications are possible. For example, in some implementations, the distributed environment depicted in FIG. 8 may have more or fewer systems or components than those shown in FIG. 1, may combine two or more systems, or may have a different configuration or arrangement of systems.

As shown in the example depicted in FIG. 8, distributed environment 800 comprises CSPI 801 that provides services and resources that customers can subscribe to and use to build their virtual cloud networks (VCNs). In certain embodiments, CSPI 801 offers IaaS services to subscribing customers. The data centers within CSPI 801 may be organized into one or more regions. One example region "Region US" 802 is shown in FIG. 8. A customer has configured a customer VCN 804 for region 802. The customer may deploy various compute instances on VCN 804, where the compute instances may include virtual machines or bare metal instances. Examples of instances include applications, database, load balancers, and the like.

In the embodiment depicted in FIG. 8, customer VCN 804 comprises two subnets, namely, "Subnet-1" and "Subnet-2", each subnet with its own CIDR IP address range. In FIG. 8, the overlay IP address range for Subnet-1 is 10.0/16 and the address range for Subnet-2 is 10.1/16. A VCN Virtual Router 805 represents a logical gateway for the VCN that enables communications between subnets of the VCN 804, and with other endpoints outside the VCN. VCN VR 805 is configured to route traffic between VNICs in VCN 804 and gateways associated with VCN 804. VCN VR 805 provides a port for each subnet of VCN 804. For example, VR 805 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 801. A compute instance participates in a subnet via a VNIC associated with the compute instance. For example, as shown in FIG. 8, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 8, compute instance C1 has an overlay IP address of 10.0.0.2 and a MAC address of M1, while compute instance C2 has an private overlay IP address of 10.0.0.3 and a MAC address of M2. Each compute instance in Subnet-1, including compute instances C1 and C2, has a default route to VCN VR 805 using IP address 10.0.0.1, which is the IP address for a port of VCN VR 805 for Subnet-1.

Subnet-2 can have multiple compute instances deployed on it, including virtual machine instances and/or bare metal instances. For example, as shown in FIG. 8, compute instances D1 and D2 are part of Subnet-2 via VNICs associated with the respective compute instances. In the embodiment depicted in FIG. 8, compute instance D1 has an overlay IP address of 10.1.0.2 and a MAC address of MM1, while compute instance D2 has an private overlay IP address of 10.1.0.3 and a MAC address of MM2. Each compute instance in Subnet-2, including compute instances D1 and D2, has a default route to VCN VR 805 using IP address 10.1.0.1, which is the IP address for a port of VCN VR 805 for Subnet-2.

VCN A 804 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 804 can communicate with various different endpoints. These endpoints may include endpoints that are hosted by CSPI 900 and endpoints outside CSPI 900. Endpoints that are hosted by CSPI 801 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 806 or 810, communications between a compute instance in Subnet-1 and an endpoint in service network 810 in the same region); or an endpoint in a VCN in a different region (e.g., communications between a compute instance in Subnet-1 and an endpoint in a VCN in a different region 808). A compute instance in a subnet hosted by CSPI 801 may also communicate with endpoints that are not hosted by CSPI 801 (i.e., are outside CSPI 801). These outside endpoints include endpoints in the customer's on-premise network 816, endpoints within other remote cloud hosted networks 818, public endpoints 814 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 8 wants to send a packet to compute instance D1 in Subnet-2, the packet is first processed by the VNIC associated with compute instance C1. The VNIC associated with compute instance C1 is configured to route the packet to the VCN VR 805 using default route or port 10.0.0.1 of the VCN VR. VCN VR 805 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 804 to an endpoint that is outside VCN 804, the communication is facilitated by the VNIC associated with the source compute instance, VCN VR 805, and gateways associated with VCN 804. One or more types of gateways may be associated with VCN 804. A gateway is an interface between a VCN and another endpoint, where the another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 804. The packet may be first processed by the VNIC associated with source compute instance C1. The VNIC processing determines that the destination for the packet is outside the Subnet-1 of C1. The VNIC associated with C1 may forward the packet to VCN VR 805 for VCN 804. VCN VR 805 then processes the packet and as part of the processing, based upon the destination for the packet, determines a particular gateway associated with VCN 804 as the next hop for the packet. VCN VR 805 may then forward the packet to the particular identified gateway. For example, if the destination is an endpoint within the customer's on-premise network, then the packet may be forwarded by VCN VR 805 to Dynamic Routing Gateway (DRG) gateway 822 configured for VCN 804. The packet may then be forwarded from the gateway to a next hop to facilitate communication of the packet to it final intended destination.

Various different types of gateways may be configured for a VCN. Examples of gateways that may be configured for a VCN are depicted in FIG. 8 and described below. Examples of gateways associated with a VCN are also depicted in FIGS. 13, 14, 15, and 16 (for example, gateways referenced by reference numbers 1334, 1336, 1338, 1434, 1436, 1438, 1534, 1536, 1538, 1634, 1636, and 1638) and described below. As shown in the embodiment depicted in FIG. 8, a Dynamic Routing Gateway (DRG) 822 may be added to or be associated with customer VCN 804 and provides a path for private network traffic communication between customer VCN 804 and another endpoint, where the another endpoint can be the customer's on-premise network 816, a VCN 808 in a different region of CSPI 801, or other remote cloud networks 818 not hosted by CSPI 801. Customer on-premise network 816 may be a customer network or a customer data center built using the customer's resources. Access to customer on-premise network 816 is generally very restricted. For a customer that has both a customer on-premise network 816 and one or more VCNs 804 deployed or hosted in the cloud by CSPI 801, the customer may want their on-premise network 816 and their cloud-based VCN 804 to be able to communicate with each other. This enables a customer to build an extended hybrid environment encompassing the customer's VCN 804 hosted by CSPI 801 and their on-premises network 816. DRG 822 enables this communication. To enable such communications, a communication channel 824 is set up where one endpoint of the channel is in customer on-premise network 816 and the other endpoint is in CSPI 801 and connected to customer VCN 804. Communication channel 824 can be over public communication networks such as the Internet or private communication networks. Various different communication protocols may be used such as IPsec VPN technology over a public communication network such as the Internet, Oracle's Fast-Connect technology that uses a private network instead of a public network, and others. The device or equipment in customer on-premise network 816 that forms one end point for communication channel 824 is referred to as the customer premise equipment (CPE), such as CPE 826 depicted in FIG. 8. On the CSPI 801 side, the endpoint may be a host machine executing DRG 822.

In certain embodiments, a Remote Peering Connection (RPC) can be added to a DRG, which allows a customer to peer one VCN with another VCN in a different region. Using such an RPC, customer VCN 804 can use DRG 822 to connect with a VCN 808 in another region. DRG 822 may also be used to communicate with other remote cloud networks 818, not hosted by CSPI 801 such as a Microsoft Azure cloud, Amazon AWS cloud, and others.

As shown in FIG. 8, an Internet Gateway (IGW) 820 may be configured for customer VCN 804 the enables a compute instance on VCN 804 to communicate with public endpoints 814 accessible over a public network such as the Internet. IGW 8120 is a gateway that connects a VCN to a public network such as the Internet. IGW 820 enables a public subnet (where the resources in the public subnet have public overlay IP addresses) within a VCN, such as VCN 804, direct access to public endpoints 812 on a public network 814 such as the Internet. Using IGW 820, connections can be initiated from a subnet within VCN 804 or from the Internet.

A Network Address Translation (NAT) gateway 828 can be configured for customer's VCN 804 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 804, with private access to public endpoints on the Internet. In NAT gateways, connections can be initiated only from the private subnet to the public Internet and not from the Internet to the private subnet.

In certain embodiments, a Service Gateway (SGW) 826 can be configured for customer VCN 804 and provides a path for private network traffic between VCN 804 and supported services endpoints in a service network 810. In certain embodiments, service network 810 may be provided by the CSP and may provide various services. An example of such a service network is Oracle's Services Network, which provides various services that can be used by customers. For example, a compute instance (e.g., a database system) in a private subnet of customer VCN 804 can back up data to a service endpoint (e.g., Object Storage) without needing public IP addresses or access to the Internet. In certain embodiments, a VCN can have only one SGW, and connections can only be initiated from a subnet within the VCN and not from service network 810. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 826 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 832 is a gateway that can be added to customer VCN 804 and enables VCN 804 to peer with another VCN in the same region. Peering means that the VCNs communicate using private IP addresses, without the traffic traversing a public network such as the Internet or without routing the traffic through the customer's on-premises network 816. In preferred embodiments, a VCN has a separate LPG for each peering it establishes. Local Peering or VCN Peering is a common practice used to establish network connectivity between different applications or infrastructure management functions.

Service providers, such as providers of services in service network 810, may provide access to services using different access models. According to a public access model, services may be exposed as public endpoints that are publicly accessible by compute instance in a customer VCN via a public network such as the Internet and or may be privately accessible via SGW 826. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. A PE thus provides a way to present a service within a private customer VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 830 is a gateway resource that can be attached to a service provider VCN (e.g., a VCN in service network 810) that acts as an ingress/egress point for all traffic from/to customer subnet private endpoints. PAGW 830 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 830 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 832 and the PE in the customer's VCN.

A customer can control routing in a VCN at the subnet level, so the customer can specify which subnets in the customer's VCN, such as VCN 804, use each gateway. A VCN's route tables are used to decide if traffic is allowed out of a VCN through a particular gateway. For example, in a particular instance, a route table for a public subnet within customer VCN 804 may send non-local traffic through IGW 820. The route table for a private subnet within the same customer VCN 804 may send traffic destined for CSP services through SGW 826. All remaining traffic may be sent via the NAT gateway 828. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked and the response is automatically allowed without an explicit security list rule for the response traffic) or stateless.

Access from a customer VCN (i.e., by a resource or compute instance deployed on VCN 804) can be categorized as public access, private access, or dedicated access. Public access refers to an access model where a public IP address or a NAT is used to access a public endpoint. Private access enables customer workloads in VCN 804 with private IP addresses (e.g., resources in a private subnet) to access services without traversing a public network such as the Internet. In certain embodiments, CSPI 801 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premise network to CSPI and its services. FastConnect provides an easy, elastic, and economical way to create a dedicated and private connection with higher bandwidth options and a more reliable and consistent networking experience when compared to Internet-based connections.

Figure 9:
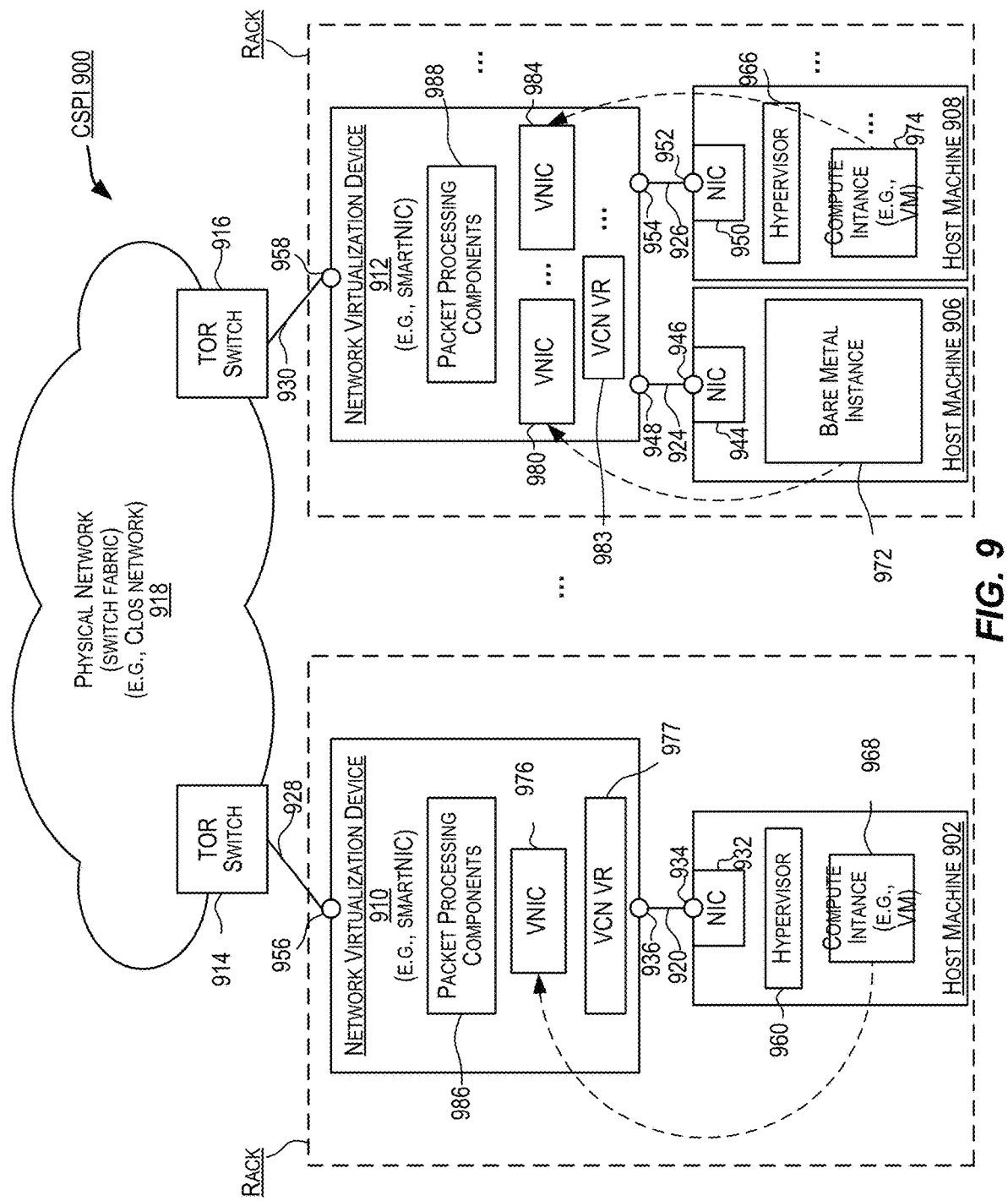
FIG. 9 depicts a simplified architectural diagram of the physical components in the physical network within CSPI according to certain embodiments.

FIG. 8 and the accompanying description above describes various virtualized components in an example virtual network. As described above, the virtual network is built on the underlying physical or substrate network. FIG. 9 depicts a simplified architectural diagram of the physical components in the physical network within CSPI 900 that provide the underlay for the virtual network according to certain embodiments. As shown, CSPI 900 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP. Based upon the services subscribed to by a customer, a subset of resources (e.g., compute, memory, and networking resources) of CSPI 900 are provisioned for the customer. Customers can then build their own cloud-based (i.e., CSPI-hosted) customizable and private virtual networks using physical compute, memory, and networking resources provided by CSPI 900. As previously indicated, these customer networks are referred to as virtual cloud networks (VCNs). A customer can deploy one or more customer resources, such as compute instances, on these customer VCNs. Compute instances can be in the form of virtual machines, bare metal instances, and the like. CSPI 900 provides infrastructure and a set of complementary cloud services that enable customers to build and run a wide range of applications and services in a highly available hosted environment.

In the example embodiment depicted in FIG. 9, the physical components of CSPI 900 include one or more physical host machines or physical servers (e.g., 902, 906, 908), network virtualization devices (NVDs) (e.g., 910, 912), top-of-rack (TOR) switches (e.g., 914, 916), and a physical network (e.g., 918), and switches in physical network 918. The physical host machines or servers may host and execute various compute instances that participate in one or more subnets of a VCN. The compute instances may include virtual machine instances, and bare metal instances. For example, the various compute instances depicted in FIG. 8 may be hosted by the physical host machines depicted in FIG. 9. The virtual machine compute instances in a VCN may be executed by one host machine or by multiple different host machines. The physical host machines may also host virtual host machines, container-based hosts or functions, and the like. The VNICs and VCN VR depicted in FIG. 8 may be executed by the NVDs depicted in FIG. 9. The gateways depicted in FIG. 8 may be executed by the host machines and/or by the NVDs depicted in FIG. 9.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 9, host machines 902 and 908 execute hypervisors 960 and 966, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 9, hypervisor 960 may sit on top of the OS of host machine 902 and enables the computing resources (e.g., processing, memory, and networking resources) of host machine 902 to be shared between compute instances (e.g., virtual machines) executed by host machine 902. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 9 may have the same or different types of hypervisors.

A compute instance can be a virtual machine instance or a bare metal instance. In FIG. 9, compute instances 968 on host machine 902 and 974 on host machine 908 are examples of virtual machine instances. Host machine 906 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 9, host machine 902 executes a virtual machine compute instance 968 that is associated with VNIC 976, and VNIC 976 is executed by NVD 910 connected to host machine 902. As another example, bare metal instance 972 hosted by host machine 906 is associated with VNIC 980 that is executed by NVD 912 connected to host machine 906. As yet another example, VNIC 984 is associated with compute instance 974 executed by host machine 908, and VNIC 984 is executed by NVD 912 connected to host machine 908.

For compute instances hosted by a host machine, an NVD connected to that host machine also executes VCN VRs corresponding to VCNs of which the compute instances are members. For example, in the embodiment depicted in FIG. 9, NVD 910 executes VCN VR 977 corresponding to the VCN of which compute instance 968 is a member. NVD 912 may also execute one or more VCN VRs 983 corresponding to VCNs corresponding to the compute instances hosted by host machines 906 and 908.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 9, host machine 902 is connected to NVD 910 using link 920 that extends between a port 934 provided by a NIC 932 of host machine 902 and between a port 936 of NVD 910. Host machine 906 is connected to NVD 912 using link 924 that extends between a port 946 provided by a NIC 944 of host machine 906 and between a port 948 of NVD 912. Host machine 908 is connected to NVD 912 using link 926 that extends between a port 952 provided by a NIC 950 of host machine 908 and between a port 954 of NVD 912.

The NVDs are in turn connected via communication links to top-of-the-rack (TOR) switches, which are connected to physical network 918 (also referred to as the switch fabric). In certain embodiments, the links between a host machine and an NVD, and between an NVD and a TOR switch are Ethernet links. For example, in FIG. 9, NVDs 910 and 912 are connected to TOR switches 914 and 916, respectively, using links 928 and 930. In certain embodiments, the links 920, 924, 926, 928, and 930 are Ethernet links. The collection of host machines and NVDs that are connected to a TOR is sometimes referred to as a rack.

Figure 12:
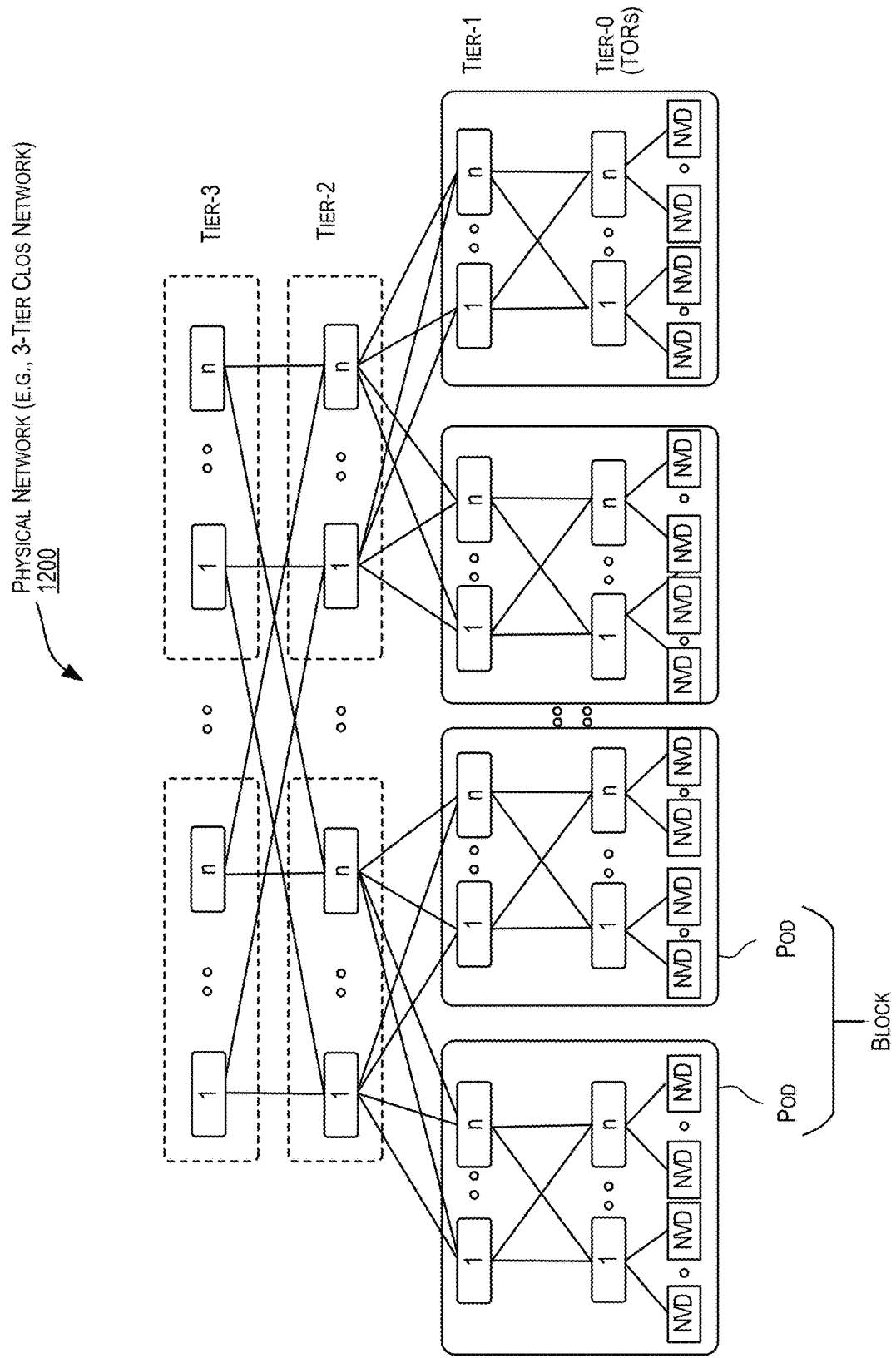
FIG. 12 depicts a simplified block diagram of a physical network provided by a CSPI according to certain embodiments.

Physical network 918 provides a communication fabric that enables TOR switches to communicate with each other. Physical network 918 can be a multi-tiered network. In certain implementations, physical network 918 is a multi-tiered Clos network of switches, with TOR switches 914 and 916 representing the leaf level nodes of the multi-tiered and multi-node physical switching network 918. Different Clos network configurations are possible including but not limited to a 2-tier network, a 3-tier network, a 4-tier network, a 5-tier network, and in general a "n"-tiered network. An example of a Clos network is depicted in FIG. 12 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 9, host machine 902 is connected to NVD 910 via NIC 932 of host machine 902. In a many-to-one configuration, multiple host machines are connected to one NVD. For example, in FIG. 9, host machines 906 and 908 are connected to the same NVD 912 via NICs 944 and 950, respectively.

Figure 10:
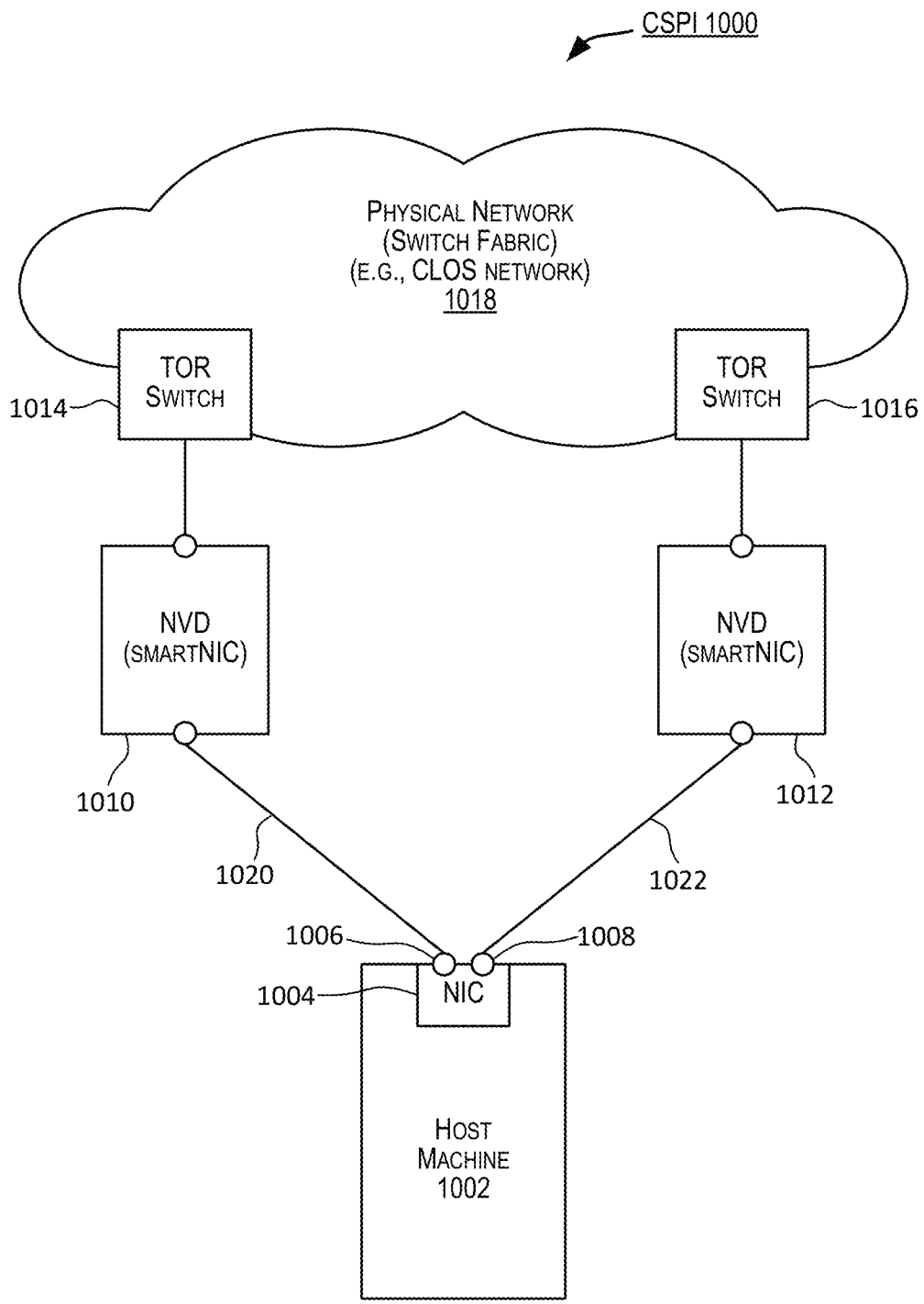
FIG. 10 shows an example arrangement within CSPI where a host machine is connected to multiple network virtualization devices (NVDs) according to certain embodiments.

In a one-to-many configuration, one host machine is connected to multiple NVDs. FIG. 10 shows an example within CSPI 1000 where a host machine is connected to multiple NVDs. As shown in FIG. 10, host machine 1002 comprises a network interface card (NIC) 1004 that includes multiple ports 1006 and 1008. Host machine 1002 is connected to a first NVD 1010 via port 1006 and link 1020, and connected to a second NVD 1012 via port 1008 and link 1022. Ports 1006 and 1008 may be Ethernet ports and the links 1020 and 1022 between host machine 1002 and NVDs 1010 and 1012 may be Ethernet links. NVD 1010 is in turn connected to a first TOR switch 1014 and NVD 1012 is connected to a second TOR switch 1016. The links between NVDs 1010 and 1012, and TOR switches 1014 and 1016 may be Ethernet links. TOR switches 1014 and 1016 represent the Tier-0 switching devices in multi-tiered physical network 1018.

The arrangement depicted in FIG. 10 provides two separate physical network paths to and from physical switch network 1018 to host machine 1002: a first path traversing TOR switch 1014 to NVD 1010 to host machine 1002, and a second path traversing TOR switch 1016 to NVD 1012 to host machine 1002. The separate paths provide for enhanced availability (referred to as high availability) of host machine 1002. If there are problems in one of the paths (e.g., a link in one of the paths goes down) or devices (e.g., a particular NVD is not functioning), then the other path may be used for communications to/from host machine 1002.

In the configuration depicted in FIG. 10, the host machine is connected to two different NVDs using two different ports provided by a NIC of the host machine. In other embodiments, a host machine may include multiple NICs that enable connectivity of the host machine to multiple NVDs.

Referring back to FIG. 9, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 9, the NVDs 910 and 912 may be implemented as smartNICs that are connected to host machines 902, and host machines 906 and 908, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 900. For example, an NVD may be embodied in a host machine where the functions performed by an NVD are performed by the host machine. As another example, an NVD may be part of a TOR switch or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 9, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 9 include port 936 on NVD 910, and ports 948 and 954 on NVD 912. A network-facing port of an NVD is a port that is used to connect the NVD to a TOR switch. Examples of network-facing ports in FIG. 9 include port 956 on NVD 910, and port 958 on NVD 912. As shown in FIG. 9, NVD 910 is connected to TOR switch 914 using link 928 that extends from port 956 of NVD 910 to the TOR switch 914. Likewise, NVD 912 is connected to TOR switch 916 using link 930 that extends from port 958 of NVD 912 to the TOR switch 916.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two end-points (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with cis in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 13, 14, 15, and 16 (see references 1316, 1416, 1516, and 1616) and described below. Examples of a VCN Data Plane are depicted in FIGS. 13, 14, 15, and 16 (see references 1318, 1418, 1518, and 1618) and described below. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 9, NVD 910 executes the functionality for VNIC 976 that is associated with compute instance 968 hosted by host machine 902 connected to NVD 910. As another example, NVD 912 executes VNIC 980 that is associated with bare metal compute instance 972 hosted by host machine 906, and executes VNIC 984 that is associated with compute instance 974 hosted by host machine 908. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 9, NVD 910 executes VCN VR 977 corresponding to the VCN to which compute instance 968 belongs. NVD 912 executes one or more VCN VRs 983 corresponding to one or more VCNs to which compute instances hosted by host machines 906 and 908 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 9. For example, NVD 910 comprises packet processing components 986 and NVD 912 comprises packet processing components 988. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 8 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 8 may be executed or hosted by one or more of the physical components depicted in FIG. 9. For example, the compute instances in a VCN may be executed or hosted by one or more host machines depicted in FIG. 9. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 9, a packet originating from compute instance 968 may be communicated from host machine 902 to NVD 910 over link 920 (using NIC 932). On NVD 910, VNIC 976 is invoked since it is the VNIC associated with source compute instance 968. VNIC 976 is configured to examine the encapsulated information in the packet, and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 900 and endpoints outside CSPI 900. Endpoints hosted by CSPI 900 may include instances in the same VCN or other VCNs, which may be the customer's VCNs, or VCNs not belonging to the customer. Communications between endpoints hosted by CSPI 900 may be performed over physical network 918. A compute instance may also communicate with endpoints that are not hosted by CSPI 900, or are outside CSPI 900. Examples of these endpoints include endpoints within a customer's on-premise network or data center, or public endpoints accessible over a public network such as the Internet. Communications with endpoints outside CSPI 900 may be performed over public networks (e.g., the Internet) (not shown in FIG. 9) or private networks (not shown in FIG. 9) using various communication protocols.

The architecture of CSPI 900 depicted in FIG. 9 is merely an example and is not intended to be limiting. Variations, alternatives, and modifications are possible in alternative embodiments. For example, in some implementations, CSPI 900 may have more or fewer systems or components than those shown in FIG. 9, may combine two or more systems, or may have a different configuration or arrangement of systems. The systems, subsystems, and other components depicted in FIG. 9 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 11:
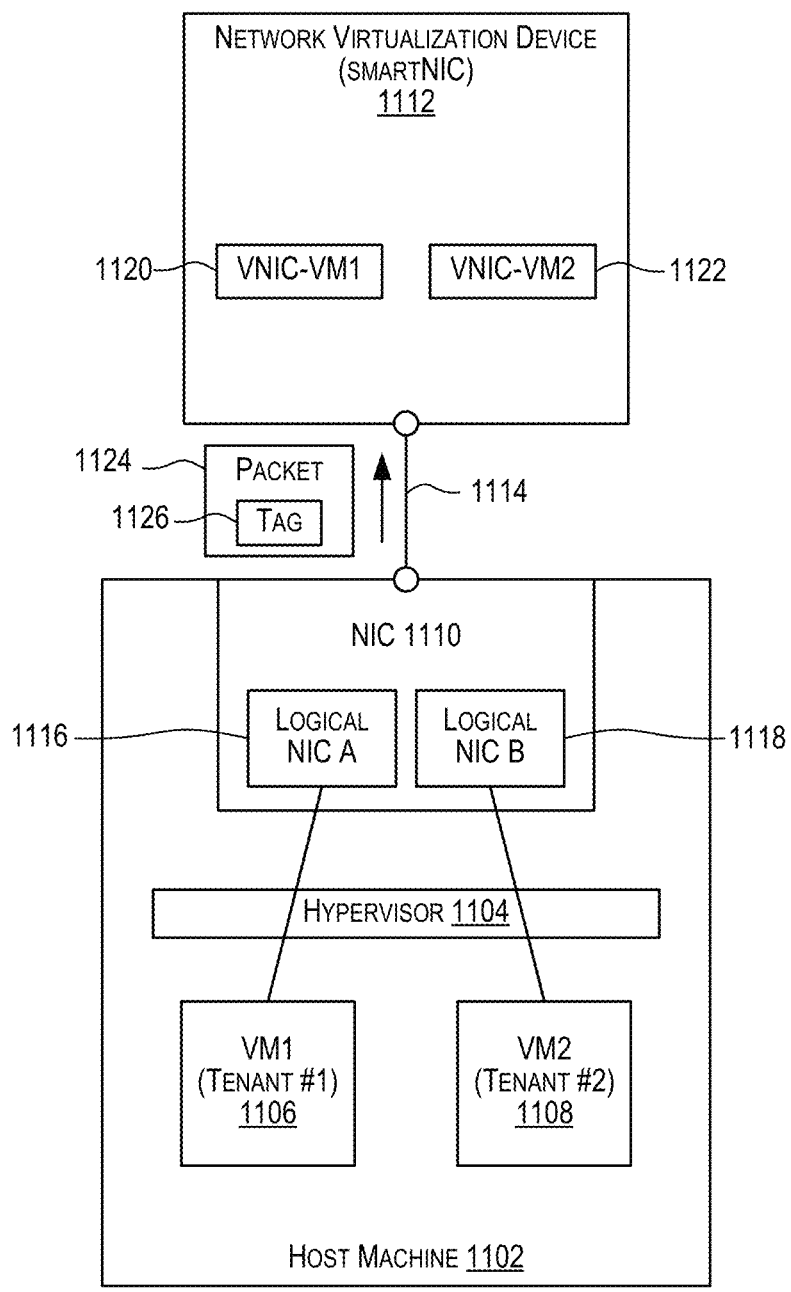
FIG. 11 depicts connectivity between a host machine and an NVD for providing I/O virtualization for supporting multitenancy according to certain embodiments.

FIG. 11 depicts connectivity between a host machine and an NVD for providing I/O virtualization for supporting multitenancy according to certain embodiments. As depicted in FIG. 11, host machine 1102 executes a hypervisor 1104 that provides a virtualized environment. Host machine 1102 executes two virtual machine instances, VM1 1106 belonging to customer/tenant #1 and VM2 1108 belonging to customer/tenant #2. Host machine 1102 comprises a physical NIC 1110 that is connected to an NVD 1112 via link 1114. Each of the compute instances is attached to a VNIC that is executed by NVD 1112. In the embodiment in FIG. 11, VM1 1106 is attached to VNIC-VM1 1120 and VM2 1108 is attached to VNIC-VM2 1122.

As shown in FIG. 11, NIC 1110 comprises two logical NICs, logical NIC A 1116 and logical NIC B 1118. Each virtual machine is attached to and configured to work with its own logical NIC. For example, VM1 1106 is attached to logical MC A 1116 and VM2 1108 is attached to logical NIC B 1118. Even though host machine 1102 comprises only one physical NIC 1110 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 1116 for Tenant #1 and a separate VLAN ID is assigned to logical NIC B 1118 for Tenant #2. When a packet is communicated from VM1 1106, a tag assigned to Tenant #1 is attached to the packet by the hypervisor and the packet is then communicated from host machine 1102 to NVD 1112 over link 1114. In a similar manner, when a packet is communicated from VM2 1108, a tag assigned to Tenant #2 is attached to the packet by the hypervisor and the packet is then communicated from host machine 1102 to NVD 1112 over link 1114. Accordingly, a packet 1124 communicated from host machine 1102 to NVD 1112 has an associated tag 1126 that identifies a specific tenant and associated VM. On the NVD, for a packet 1124 received from host machine 1102, the tag 1126 associated with the packet is used to determine whether the packet is to be processed by VNIC-VM1 1120 or by VNIC-VM2 1122. The packet is then processed by the corresponding VNIC. The configuration depicted in FIG. 11 enables each tenant's compute instance to believe that they own their own host machine and NIC. The setup depicted in FIG. 11 provides for I/O virtualization for supporting multi-tenancy.

FIG. 12 depicts a simplified block diagram of a physical network 1200 according to certain embodiments. The embodiment depicted in FIG. 12 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 12 is a 3-tiered network comprising tiers 1, 2, and 3. The TOR switches 1204 represent Tier-0 switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. 12, a set of "n" Tier-0 TOR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 1200 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID). This identifier is included as part of the resource's information and can be used to manage the resource, for example, via a Console or through APIs. An example syntax for a CID is:

ocid1.<RESOURCE TYPE>.<REALM>.[REGION][.FUTURE USE].<UNIQUE ID> where, ocid1: The literal string indicating the version of the CID;

resource type: The type of resource (for example, instance, volume, VCN, subnet, user, group, and so on);

realm: The realm the resource is in. Example values are "c1" for the commercial realm, "c2" for the Government Cloud realm, or "c3" for the Federal Government Cloud realm, etc. Each realm may have its own domain name;

region: The region the resource is in. If the region is not applicable to the resource, this part might be blank;

future use: Reserved for future use.

unique ID: The unique portion of the ID. The format may vary depending on the type of resource or service.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 13:
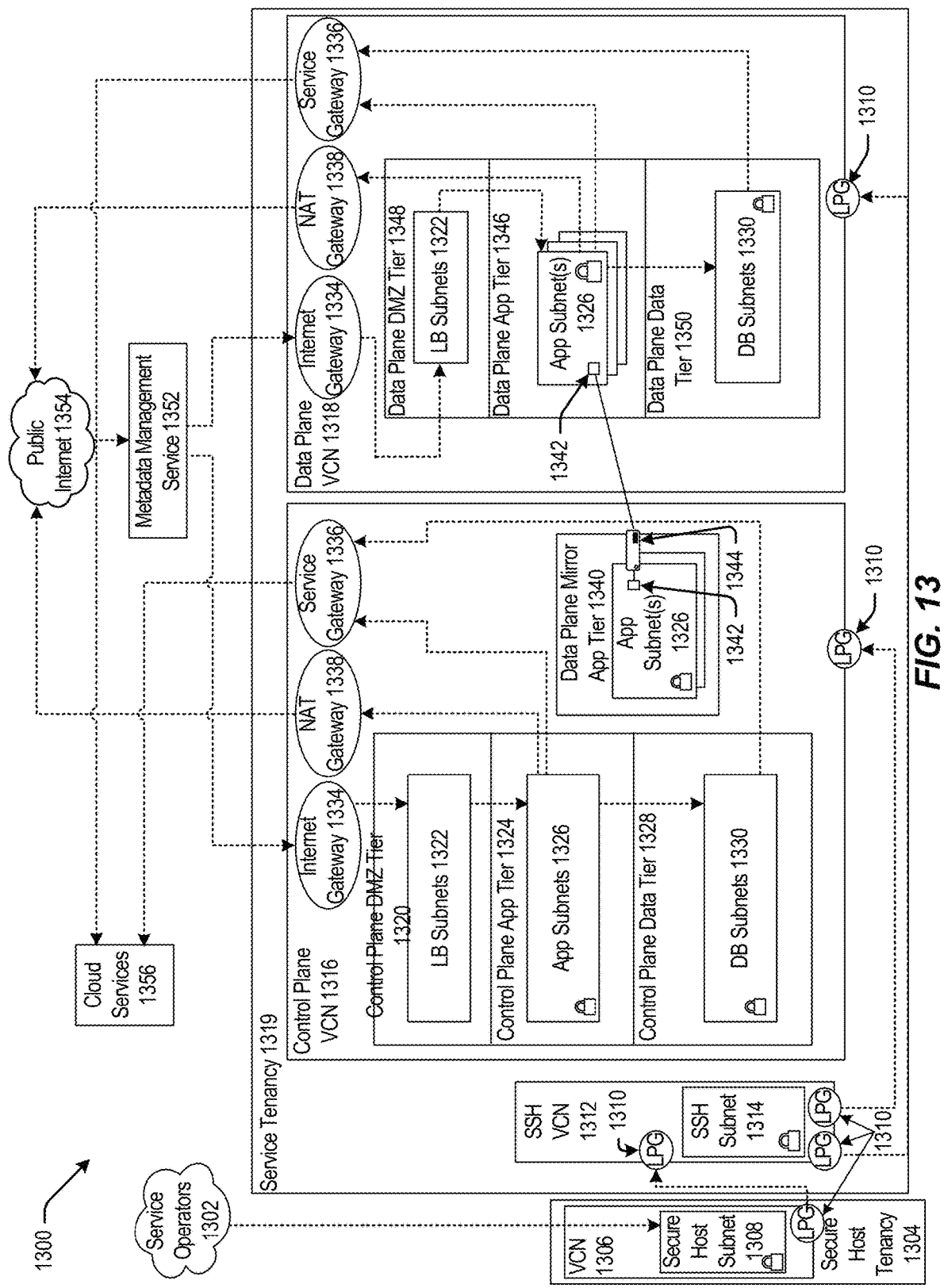
FIG. 13 is a block diagram illustrating one pattern for implementing a cloud infrastructure as a service system, according to at least one embodiment.

FIG. 13 is a block diagram 1300 illustrating an example pattern of an IaaS architecture, according to at least one embodiment. Service operators 1302 can be communicatively coupled to a secure host tenancy 1304 that can include a virtual cloud network (VCN) 1306 and a secure host subnet 1308. In some examples, the service operators 1302 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1306 and/or the Internet.

The VCN 1306 can include a local peering gateway (LPG) 1310 that can be communicatively coupled to a secure shell (SSH) VCN 1312 via an LPG 1310 contained in the SSH VCN 1312. The SSH VCN 1312 can include an SSH subnet 1314, and the SSH VCN 1312 can be communicatively coupled to a control plane VCN 1316 via the LPG 1310 contained in the control plane VCN 1316. Also, the SSH VCN 1312 can be communicatively coupled to a data plane VCN 1318 via an LPG 1310. The control plane VCN 1316 and the data plane VCN 1318 can be contained in a service tenancy 1319 that can be owned and/or operated by the IaaS provider.

The control plane VCN 1316 can include a control plane demilitarized zone (DMZ) tier 1320 that acts as a perimeter network (e.g., portions of a corporate network between the corporate intranet and external networks). The DMZ-based servers may have restricted responsibilities and help keep security breaches contained. Additionally, the DMZ tier 1320 can include one or more load balancer (LB) subnet(s) 1322, a control plane app tier 1324 that can include app subnet(s) 1326, a control plane data tier 1328 that can include database (DB) subnet(s) 1330 (e.g., frontend DB subnet(s) and/or backend DB subnet(s)). The LB subnet(s) 1322 contained in the control plane DMZ tier 1320 can be communicatively coupled to the app subnet(s) 1326 contained in the control plane app tier 1324 and an Internet gateway 1334 that can be contained in the control plane VCN 1316, and the app subnet(s) 1326 can be communicatively coupled to the DB subnet(s) 1330 contained in the control plane data tier 1328 and a service gateway 1336 and a network address translation (NAT) gateway 1338. The control plane VCN 1316 can include the service gateway 1336 and the NAT gateway 1338.

The control plane VCN 1316 can include a data plane mirror app tier 1340 that can include app subnet(s) 1326. The app subnet(s) 1326 contained in the data plane mirror app tier 1340 can include a virtual network interface controller (VNIC) 1342 that can execute a compute instance 1344. The compute instance 1344 can communicatively couple the app subnet(s) 1326 of the data plane mirror app tier 1340 to app subnet(s) 1326 that can be contained in a data plane app tier 1346.

The data plane VCN 1318 can include the data plane app tier 1346, a data plane DMZ tier 1348, and a data plane data tier 1350. The data plane DMZ tier 1348 can include LB subnet(s) 1322 that can be communicatively coupled to the app subnet(s) 1326 of the data plane app tier 1346 and the Internet gateway 1334 of the data plane VCN 1318. The app subnet(s) 1326 can be communicatively coupled to the service gateway 1336 of the data plane VCN 1318 and the NAT gateway 1338 of the data plane VCN 1318. The data plane data tier 1350 can also include the DB subnet(s) 1330 that can be communicatively coupled to the app subnet(s) 1326 of the data plane app tier 1346.

The Internet gateway 1334 of the control plane VCN 1316 and of the data plane VCN 1318 can be communicatively coupled to a metadata management service 1352 that can be communicatively coupled to public Internet 1354. Public Internet 1354 can be communicatively coupled to the NAT gateway 1338 of the control plane VCN 1316 and of the data plane VCN 1318. The service gateway 1336 of the control plane VCN 1316 and of the data plane VCN 1318 can be communicatively couple to cloud services 1356.

In some examples, the service gateway 1336 of the control plane VCN 1316 or of the data plane VCN 1318 can make application programming interface (API) calls to cloud services 1356 without going through public Internet 1354. The API calls to cloud services 1356 from the service gateway 1336 can be one-way: the service gateway 1336 can make API calls to cloud services 1356, and cloud services 1356 can send requested data to the service gateway 1336. But, cloud services 1356 may not initiate API calls to the service gateway 1336.

In some examples, the secure host tenancy 1304 can be directly connected to the service tenancy 1319, which may be otherwise isolated. The secure host subnet 1308 can communicate with the SSH subnet 1314 through an LPG 1310 that may enable two-way communication over an otherwise isolated system. Connecting the secure host subnet 1308 to the SSH subnet 1314 may give the secure host subnet 1308 access to other entities within the service tenancy 1319.

The control plane VCN 1316 may allow users of the service tenancy 1319 to set up or otherwise provision desired resources. Desired resources provisioned in the control plane VCN 1316 may be deployed or otherwise used in the data plane VCN 1318. In some examples, the control plane VCN 1316 can be isolated from the data plane VCN 1318, and the data plane mirror app tier 1340 of the control plane VCN 1316 can communicate with the data plane app tier 1346 of the data plane VCN 1318 via VNICs 1342 that can be contained in the data plane mirror app tier 1340 and the data plane app tier 1346.

In some examples, users of the system, or customers, can make requests, for example create, read, update, or delete (CRUD) operations, through public Internet 1354 that can communicate the requests to the metadata management service 1352. The metadata management service 1352 can communicate the request to the control plane VCN 1316 through the Internet gateway 1334. The request can be received by the LB subnet(s) 1322 contained in the control plane DMZ tier 1320. The LB subnet(s) 1322 may determine that the request is valid, and in response to this determination, the LB subnet(s) 1322 can transmit the request to app subnet(s) 1326 contained in the control plane app tier 1324. If the request is validated and requires a call to public Internet 1354, the call to public Internet 1354 may be transmitted to the NAT gateway 1338 that can make the call to public Internet 1354. Memory that may be desired to be stored by the request can be stored in the DB subnet(s) 1330.

In some examples, the data plane mirror app tier 1340 can facilitate direct communication between the control plane VCN 1316 and the data plane VCN 1318. For example, changes, updates, or other suitable modifications to configuration may be desired to be applied to the resources contained in the data plane VCN 1318. Via a VNIC 1342, the control plane VCN 1316 can directly communicate with, and can thereby execute the changes, updates, or other suitable modifications to configuration to, resources contained in the data plane VCN 1318.

In some embodiments, the control plane VCN 1316 and the data plane VCN 1318 can be contained in the service tenancy 1319. In this case, the user, or the customer, of the system may not own or operate either the control plane VCN 1316 or the data plane VCN 1318. Instead, the IaaS provider may own or operate the control plane VCN 1316 and the data plane VCN 1318, both of which may be contained in the service tenancy 1319. This embodiment can enable isolation of networks that may prevent users or customers from interacting with other users', or other customers', resources. Also, this embodiment may allow users or customers of the system to store databases privately without needing to rely on public Internet 1354, which may not have a desired level of security, for storage.

In other embodiments, the LB subnet(s) 1322 contained in the control plane VCN 1316 can be configured to receive a signal from the service gateway 1336. In this embodiment, the control plane VCN 1316 and the data plane VCN 1318 may be configured to be called by a customer of the IaaS provider without calling public Internet 1354. Customers of the IaaS provider may desire this embodiment since database(s) that the customers use may be controlled by the IaaS provider and may be stored on the service tenancy 1319, which may be isolated from public Internet 1354.

Figure 14:
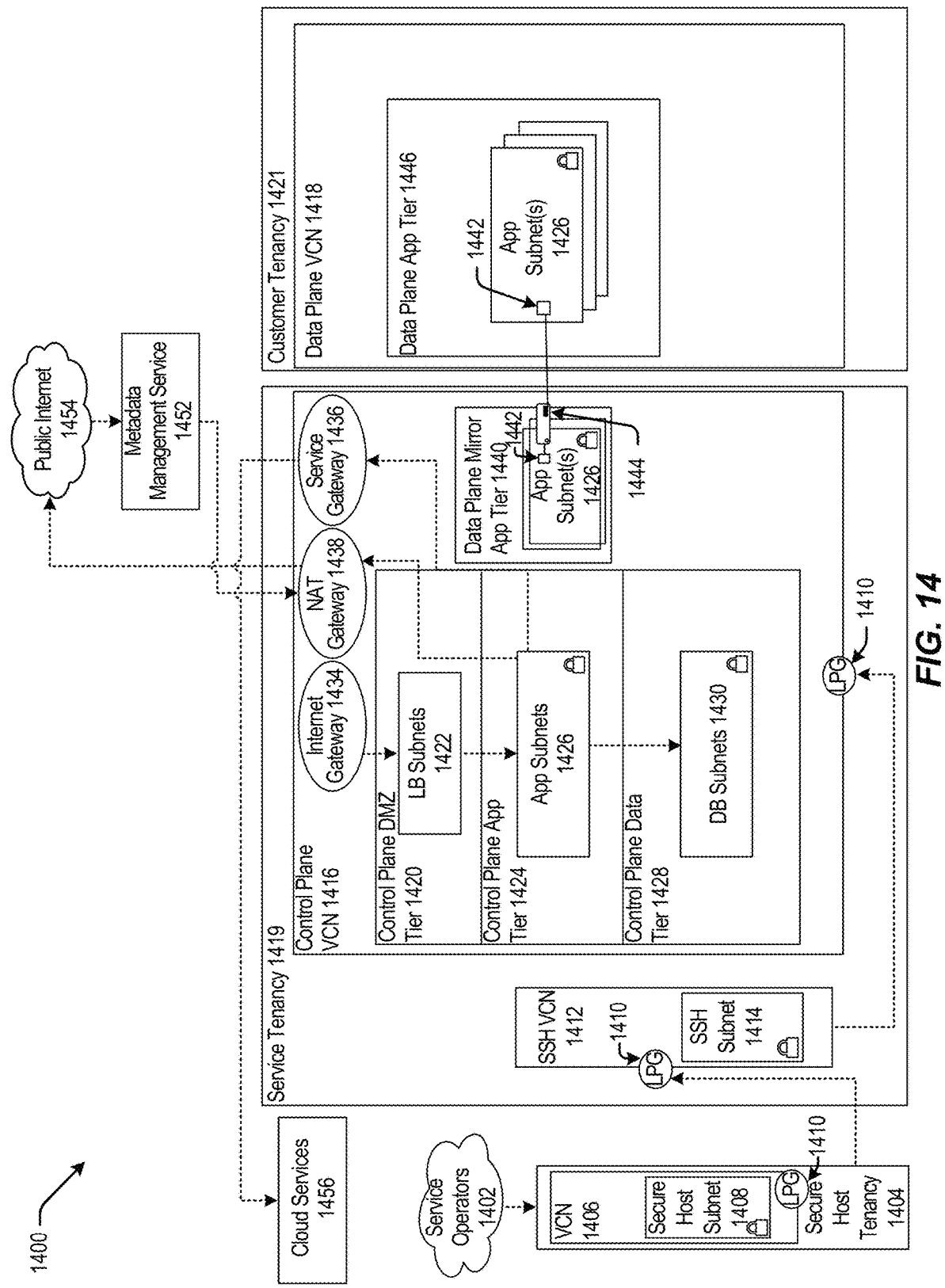
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g. service operators 1302 of FIG. 13) can be communicatively coupled to a secure host tenancy 1404 (e.g. the secure host tenancy 1304 of FIG. 13) that can include a virtual cloud network (VCN) 1406 (e.g. the VCN 1306 of FIG. 13) and a secure host subnet 1408 (e.g. the secure host subnet 1308 of FIG. 13). The VCN 1406 can include a local peering gateway (LPG) 1410 (e.g. the LPG 1310 of FIG. 13) that can be communicatively coupled to a secure shell (SSH) VCN 1412 (e.g. the SSH VCN 1312 of FIG. 13) via an LPG 1310 contained in the SSH VCN 1412. The SSH VCN 1412 can include an SSH subnet 1414 (e.g. the SSH subnet 1314 of FIG. 13), and the SSH VCN 1412 can be communicatively coupled to a control plane VCN 1416 (e.g. the control plane VCN 1316 of FIG. 13) via an LPG 1410 contained in the control plane VCN 1416. The control plane VCN 1416 can be contained in a service tenancy 1419 (e.g. the service tenancy 1319 of FIG. 13), and the data plane VCN 1418 (e.g. the data plane VCN 1318 of FIG. 13) can be contained in a customer tenancy 1421 that may be owned or operated by users, or customers, of the system.

The control plane VCN 1416 can include a control plane DMZ tier 1420 (e.g. the control plane DMZ tier 1320 of FIG. 13) that can include LB subnet(s) 1422 (e.g. LB subnet(s) 1322 of FIG. 13), a control plane app tier 1424 (e.g. the control plane app tier 1324 of FIG. 13) that can include app subnet(s) 1426 (e.g. app subnet(s) 1326 of FIG. 13), a control plane data tier 1428 (e.g. the control plane data tier 1328 of FIG. 13) that can include database (DB) subnet(s) 1430 (e.g. similar to DB subnet(s) 1330 of FIG. 13). The LB subnet(s) 1422 contained in the control plane DMZ tier 1420 can be communicatively coupled to the app subnet(s) 1426 contained in the control plane app tier 1424 and an Internet gateway 1434 (e.g. the Internet gateway 1334 of FIG. 13) that can be contained in the control plane VCN 1416, and the app subnet(s) 1426 can be communicatively coupled to the DB subnet(s) 1430 contained in the control plane data tier 1428 and a service gateway 1436 (e.g. the service gateway of FIG. 13) and a network address translation (NAT) gateway 1438 (e.g. the NAT gateway 1338 of FIG. 13). The control plane VCN 1416 can include the service gateway 1436 and the NAT gateway 1438.

The control plane VCN 1416 can include a data plane mirror app tier 1440 (e.g. the data plane mirror app tier 1340 of FIG. 13) that can include app subnet(s) 1426. The app subnet(s) 1426 contained in the data plane mirror app tier 1440 can include a virtual network interface controller (VNIC) 1442 (e.g. the VNIC of 1342) that can execute a compute instance 1444 (e.g. similar to the compute instance

1344 of FIG. 13). The compute instance 1444 can facilitate communication between the app subnet(s) 1426 of the data plane mirror app tier 1440 and the app subnet(s) 1426 that can be contained in a data plane app tier 1446 (e.g. the data plane app tier 1346 of FIG. 13) via the VNIC 1442 contained in the data plane mirror app tier 1440 and the VNIC 1442 contained in the data plane app tier 1446.

The Internet gateway 1434 contained in the control plane VCN 1416 can be communicatively coupled to a metadata management service 1452 (e.g. the metadata management service 1352 of FIG. 13) that can be communicatively coupled to public Internet 1454 (e.g. public Internet 1354 of FIG. 13). Public Internet 1454 can be communicatively coupled to the NAT gateway 1438 contained in the control plane VCN 1416. The service gateway 1436 contained in the control plane VCN 1416 can be communicatively couple to cloud services 1456 (e.g. cloud services 1356 of FIG. 13).

In some examples, the data plane VCN 1418 can be contained in the customer tenancy 1421. In this case, the IaaS provider may provide the control plane VCN 1416 for each customer, and the IaaS provider may, for each customer, set up a unique compute instance 1444 that is contained in the service tenancy 1419. Each compute instance 1444 may allow communication between the control plane VCN 1416, contained in the service tenancy 1419, and the data plane VCN 1418 that is contained in the customer tenancy 1421. The compute instance 1444 may allow resources, that are provisioned in the control plane VCN 1416 that is contained in the service tenancy 1419, to be deployed or otherwise used in the data plane VCN 1418 that is contained in the customer tenancy 1421.

In other examples, the customer of the IaaS provider may have databases that live in the customer tenancy 1421. In this example, the control plane VCN 1416 can include the data plane mirror app tier 1440 that can include app subnet(s) 1426. The data plane mirror app tier 1440 can reside in the data plane VCN 1418, but the data plane mirror app tier 1440 may not live in the data plane VCN 1418. That is, the data plane mirror app tier 1440 may have access to the customer tenancy 1421, but the data plane mirror app tier 1440 may not exist in the data plane VCN 1418 or be owned or operated by the customer of the IaaS provider. The data plane mirror app tier 1440 may be configured to make calls to the data plane VCN 1418 but may not be configured to make calls to any entity contained in the control plane VCN 1416. The customer may desire to deploy or otherwise use resources in the data plane VCN 1418 that are provisioned in the control plane VCN 1416, and the data plane mirror app tier 1440 can facilitate the desired deployment, or other usage of resources, of the customer.

In some embodiments, the customer of the IaaS provider can apply filters to the data plane VCN 1418. In this embodiment, the customer can determine what the data plane VCN 1418 can access, and the customer may restrict access to public Internet 1454 from the data plane VCN 1418. The IaaS provider may not be able to apply filters or otherwise control access of the data plane VCN 1418 to any outside networks or databases. Applying filters and controls by the customer onto the data plane VCN 1418, contained in the customer tenancy 1421, can help isolate the data plane VCN 1418 from other customers and from public Internet 1454.

In some embodiments, cloud services 1456 can be called by the service gateway 1436 to access services that may not exist on public Internet 1454, on the control plane VCN 1416, or on the data plane VCN 1418. The connection between cloud services 1456 and the control plane VCN 1416 or the data plane VCN 1418 may not be live or continuous. Cloud services 1456 may exist on a different network owned or operated by the IaaS provider. Cloud services 1456 may be configured to receive calls from the service gateway 1436 and may be configured to not receive calls from public Internet 1454. Some cloud services 1456 may be isolated from other cloud services 1456, and the control plane VCN 1416 may be isolated from cloud services 1456 that may not be in the same region as the control plane VCN 1416. For example, the control plane VCN 1416 may be located in "Region 1," and cloud service "Deployment 13," may be located in Region 1 and in "Region 2." If a call to Deployment 13 is made by the service gateway 1436 contained in the control plane VCN 1416 located in Region 1, the call may be transmitted to Deployment 13 in Region 1. In this example, the control plane VCN 1416, or Deployment 13 in Region 1, may not be communicatively coupled to, or otherwise in communication with, Deployment 13 in Region 2.

Figure 15:
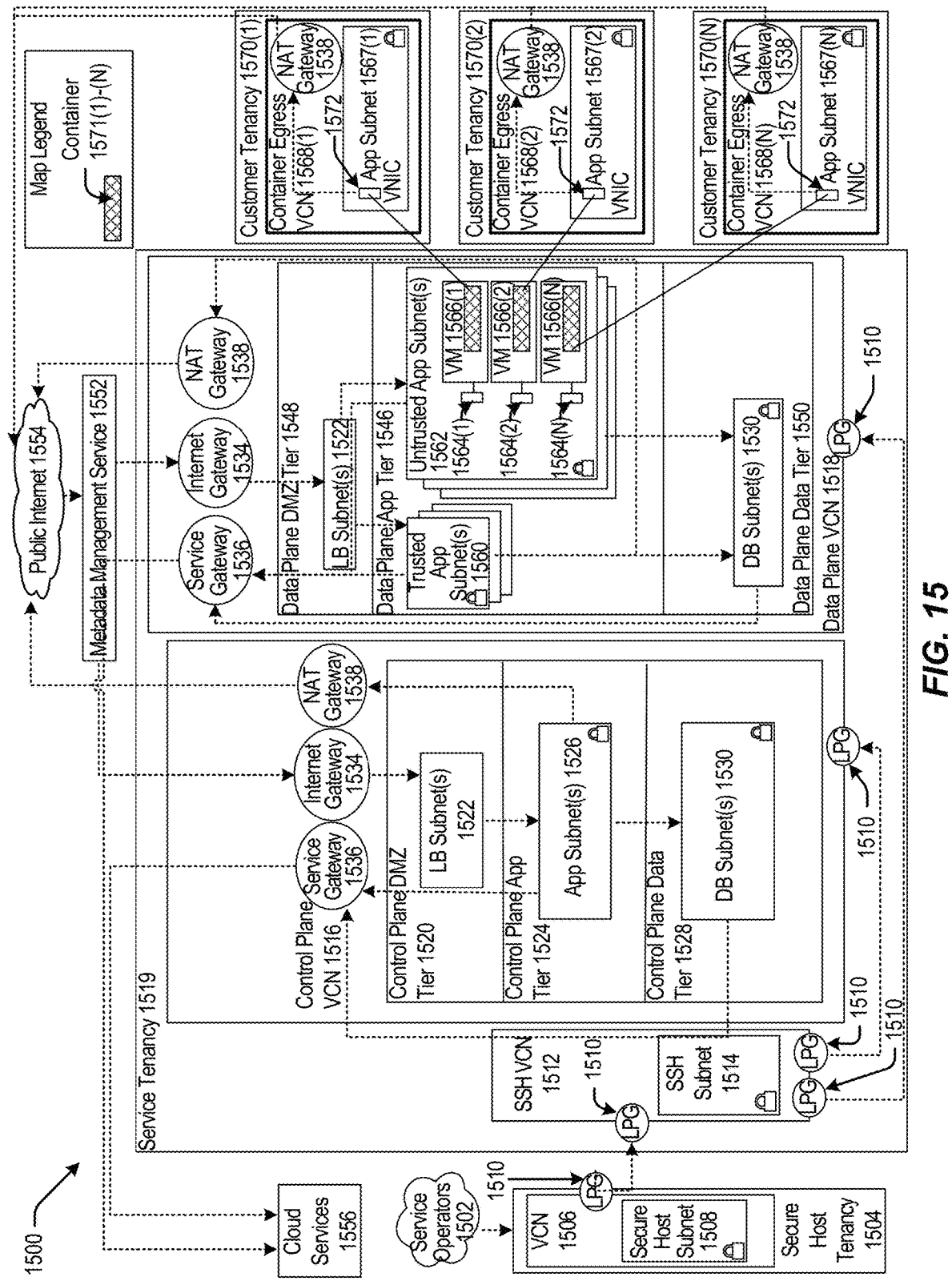
FIG. 15 is a block diagram illustrating another pattern for implementing a cloud infrastructure as a service system, according to at least one embodiment.

FIG. 15 is a block diagram 1500 illustrating another example pattern of an IaaS architecture, according to at least one embodiment. Service operators 1502 (e.g. service operators 1302 of FIG. 13) can be communicatively coupled to a secure host tenancy 1504 (e.g. the secure host tenancy 1304 of FIG. 13) that can include a virtual cloud network (VCN) 1506 (e.g. the VCN 1306 of FIG. 13) and a secure host subnet 1508 (e.g. the secure host subnet 1308 of FIG. 13). The VCN 1506 can include an LPG 1510 (e.g. the LPG 1310 of FIG. 13) that can be communicatively coupled to an SSH VCN 1512 (e.g. the SSH VCN 1312 of FIG. 13) via an LPG 1510 contained in the SSH VCN 1512. The SSH VCN 1512 can include an SSH subnet 1514 (e.g. the SSH subnet 1314 of FIG. 13), and the SSH VCN 1512 can be communicatively coupled to a control plane VCN 1516 (e.g. the control plane VCN 1316 of FIG. 13) via an LPG 1510 contained in the control plane VCN 1516 and to a data plane VCN 1518 (e.g. the data plane 1318 of FIG. 13) via an LPG 1510 contained in the data plane VCN 1518. The control plane VCN 1516 and the data plane VCN 1518 can be contained in a service tenancy 1519 (e.g. the service tenancy 1319 of FIG. 13).

The control plane VCN 1516 can include a control plane DMZ tier 1520 (e.g. the control plane DMZ tier 1320 of FIG. 13) that can include load balancer (LB) subnet(s) 1522 (e.g. LB subnet(s) 1322 of FIG. 13), a control plane app tier 1524 (e.g. the control plane app tier 1324 of FIG. 13) that can include app subnet(s) 1526 (e.g. similar to app subnet(s) 1326 of FIG. 13), a control plane data tier 1528 (e.g. the control plane data tier 1328 of FIG. 13) that can include DB subnet(s) 1530. The LB subnet(s) 1522 contained in the control plane DMZ tier 1520 can be communicatively coupled to the app subnet(s) 1526 contained in the control plane app tier 1524 and to an Internet gateway 1534 (e.g. the Internet gateway 1334 of FIG. 13) that can be contained in the control plane VCN 1516, and the app subnet(s) 1526 can be communicatively coupled to the DB subnet(s) 1530 contained in the control plane data tier 1528 and to a service gateway 1536 (e.g. the service gateway of FIG. 13) and a network address translation (NAT) gateway 1538 (e.g. the NAT gateway 1338 of FIG. 13). The control plane VCN 1516 can include the service gateway 1536 and the NAT gateway 1538.

The data plane VCN 1518 can include a data plane app tier 1546 (e.g. the data plane app tier 1346 of FIG. 13), a data plane DMZ tier 1548 (e.g. the data plane DMZ tier 1348 of FIG. 13), and a data plane data tier 1550 (e.g. the data plane data tier 1350 of FIG. 13). The data plane DMZ tier 1548 can include LB subnet(s) 1522 that can be communicatively coupled to trusted app subnet(s) 1560 and untrusted app subnet(s) 1562 of the data plane app tier 1546 and the Internet gateway 1534 contained in the data plane VCN 1518. The trusted app subnet(s) 1560 can be communicatively coupled to the service gateway 1536 contained in the data plane VCN 1518, the NAT gateway 1538 contained in the data plane VCN 1518, and DB subnet(s) 1530 contained in the data plane data tier 1550. The untrusted app subnet(s) 1562 can be communicatively coupled to the service gateway 1536 contained in the data plane VCN 1518 and DB subnet(s) 1530 contained in the data plane data tier 1550. The data plane data tier 1550 can include DB subnet(s) 1530 that can be communicatively coupled to the service gateway 1536 contained in the data plane VCN 1518.

The untrusted app subnet(s) 1562 can include one or more primary VNICs 1564(1)-(N) that can be communicatively coupled to tenant virtual machines (VMs) 1566(1)-(N). Each tenant VM 1566(1)-(N) can be communicatively coupled to a respective app subnet 1567(1)-(N) that can be contained in respective container egress VCNs 1568(1)-(N) that can be contained in respective customer tenancies 1570(1)-(N). Respective secondary VNICs 1572(1)-(N) can facilitate communication between the untrusted app subnet(s) 1562 contained in the data plane VCN 1518 and the app subnet contained in the container egress VCNs 1568(1)-(N). Each container egress VCNs 1568(1)-(N) can include a NAT gateway 1538 that can be communicatively coupled to public Internet 1554 (e.g. public Internet 1354 of FIG. 13).

The Internet gateway 1534 contained in the control plane VCN 1516 and contained in the data plane VCN 1518 can be communicatively coupled to a metadata management service 1552 (e.g. the metadata management system 1352 of FIG. 13) that can be communicatively coupled to public Internet 1554. Public Internet 1554 can be communicatively coupled to the NAT gateway 1538 contained in the control plane VCN 1516 and contained in the data plane VCN 1518. The service gateway 1536 contained in the control plane VCN 1516 and contained in the data plane VCN 1518 can be communicatively couple to cloud services 1556.

In some embodiments, the data plane VCN 1518 can be integrated with customer tenancies 1570. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1546. Code to run the function may be executed in the VMs 1566(1)-(N), and the code may not be configured to run anywhere else on the data plane VCN 1518. Each VM 1566(1)-(N) may be connected to one customer tenancy 1570. Respective containers 1571(1)-(N) contained in the VMs 1566(1)-(N) may be configured to run the code. In this case, there can be a dual isolation (e.g., the containers 1571(1)-(N) running code, where the containers 1571(1)-(N) may be contained in at least the VM 1566(1)-(N) that are contained in the untrusted app subnet(s) 1562), which may help prevent incorrect or otherwise undesirable code from damaging the network of the IaaS provider or from damaging a network of a different customer. The containers 1571(1)-(N) may be communicatively coupled to the customer tenancy 1570 and may be configured to transmit or receive data from the customer tenancy 1570. The containers 1571(1)-(N) may not be configured to transmit or receive data from any other entity in the data plane VCN 1518. Upon completion of running the code, the IaaS provider may kill or otherwise dispose of the containers 1571(1)-(N).

In some embodiments, the trusted app subnet(s) 1560 may run code that may be owned or operated by the IaaS provider. In this embodiment, the trusted app subnet(s) 1560 may be communicatively coupled to the DB subnet(s) 1530 and be configured to execute CRUD operations in the DB subnet(s) 1530. The untrusted app subnet(s) 1562 may be communicatively coupled to the DB subnet(s) 1530, but in this embodiment, the untrusted app subnet(s) may be configured to execute read operations in the DB subnet(s) 1530. The containers 1571(1)-(N) that can be contained in the VM 1566(1)-(N) of each customer and that may run code from the customer may not be communicatively coupled with the DB subnet(s) 1530.

In other embodiments, the control plane VCN 1516 and the data plane VCN 1518 may not be directly communicatively coupled. In this embodiment, there may be no direct communication between the control plane VCN 1516 and the data plane VCN 1518. However, communication can occur indirectly through at least one method. An LPG 1510 may be established by the IaaS provider that can facilitate communication between the control plane VCN 1516 and the data plane VCN 1518. In another example, the control plane VCN 1516 or the data plane VCN 1518 can make a call to cloud services 1556 via the service gateway 1536. For example, a call to cloud services 1556 from the control plane VCN 1516 can include a request for a service that can communicate with the data plane VCN 1518.

Figure 16:
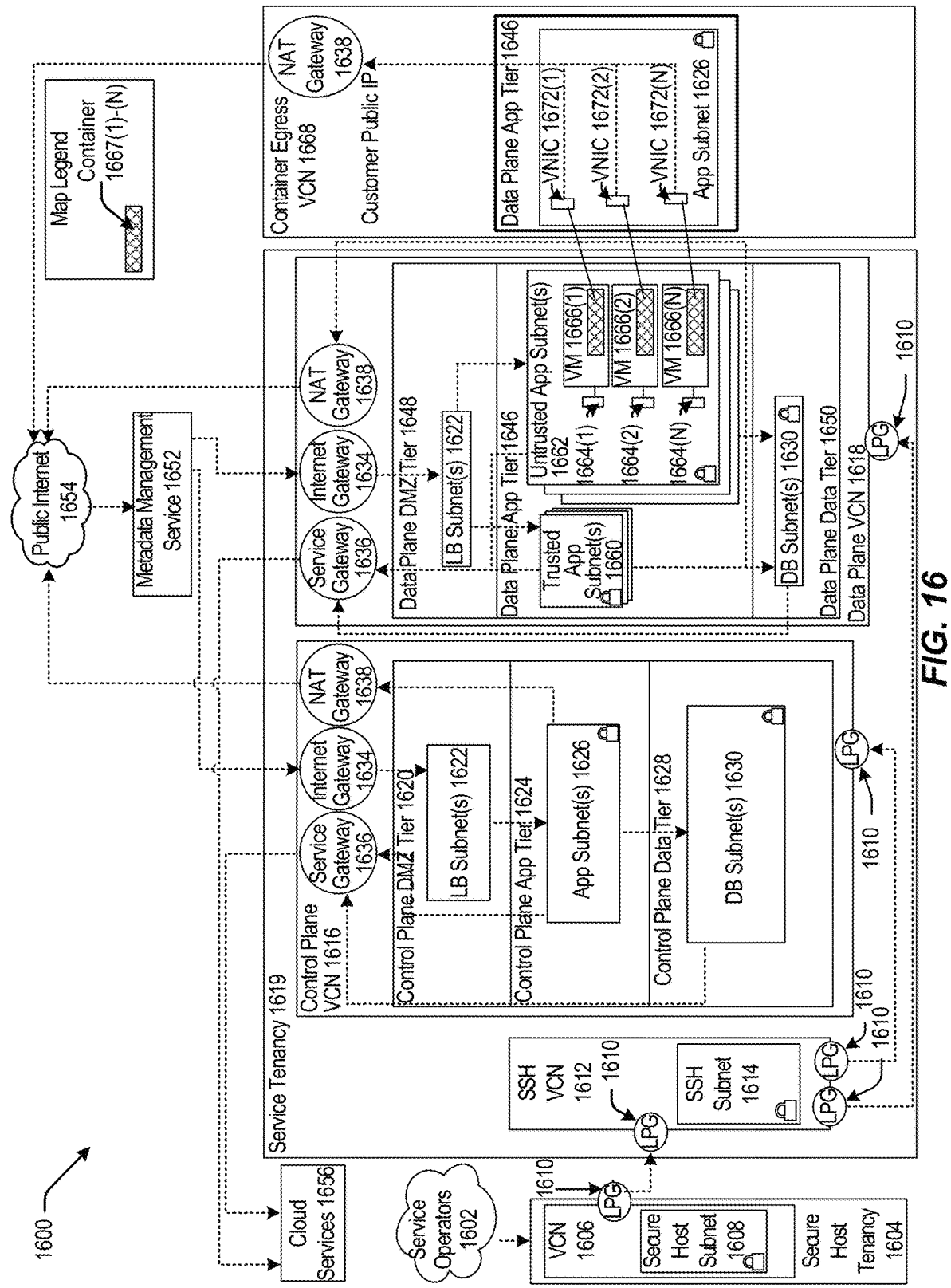
FIG. 16 is a block diagram illustrating another pattern for implementing a cloud infrastructure as a service system, according to at least one embodiment.

FIG. 16 is a block diagram 1600 illustrating another example pattern of an IaaS architecture, according to at least one embodiment. Service operators 1602 (e.g. service operators 1302 of FIG. 13) can be communicatively coupled to a secure host tenancy 1604 (e.g. the secure host tenancy 1304 of FIG. 13) that can include a virtual cloud network (VCN) 1606 (e.g. the VCN 1306 of FIG. 13) and a secure host subnet 1608 (e.g. the secure host subnet 1308 of FIG. 13). The VCN 1606 can include an LPG 1610 (e.g. the LPG 1310 of FIG. 13) that can be communicatively coupled to an SSH VCN 1612 (e.g. the SSH VCN 1312 of FIG. 13) via an LPG 1610 contained in the SSH VCN 1612. The SSH VCN 1612 can include an SSH subnet 1614 (e.g. the SSH subnet 1314 of FIG. 13), and the SSH VCN 1612 can be communicatively coupled to a control plane VCN 1616 (e.g. the control plane VCN 1316 of FIG. 13) via an LPG 1610 contained in the control plane VCN 1616 and to a data plane VCN 1618 (e.g. the data plane 1318 of FIG. 13) via an LPG 1610 contained in the data plane VCN 1618. The control plane VCN 1616 and the data plane VCN 1618 can be contained in a service tenancy 1619 (e.g. the service tenancy 1319 of FIG. 13).

The control plane VCN 1616 can include a control plane DMZ tier 1620 (e.g. the control plane DMZ tier 1320 of FIG. 13) that can include LB subnet(s) 1622 (e.g. LB subnet(s) 1322 of FIG. 13), a control plane app tier 1624 (e.g. the control plane app tier 1324 of FIG. 13) that can include app subnet(s) 1626 (e.g. app subnet(s) 1326 of FIG. 13), a control plane data tier 1628 (e.g. the control plane data tier 1328 of FIG. 13) that can include DB subnet(s) 1630 (e.g. DB subnet(s) 1530 of FIG. 15). The LB subnet(s) 1622 contained in the control plane DMZ tier 1620 can be communicatively coupled to the app subnet(s) 1626 contained in the control plane app tier 1624 and to an Internet gateway 1634 (e.g. the Internet gateway 1334 of FIG. 13)

that can be contained in the control plane VCN 1616, and the app subnet(s) 1626 can be communicatively coupled to the DB subnet(s) 1630 contained in the control plane data tier 1628 and to a service gateway 1636 (e.g. the service gateway of FIG. 13) and a network address translation (NAT) gateway 1638 (e.g. the NAT gateway 1338 of FIG. 13). The control plane VCN 1616 can include the service gateway 1636 and the NAT gateway 1638.

The data plane VCN 1618 can include a data plane app tier 1646 (e.g. the data plane app tier 1346 of FIG. 13), a data plane DMZ tier 1648 (e.g. the data plane DMZ tier 1348 of FIG. 13), and a data plane data tier 1650 (e.g. the data plane data tier 1350 of FIG. 13). The data plane DMZ tier 1648 can include LB subnet(s) 1622 that can be communicatively coupled to trusted app subnet(s) 1660 (e.g. trusted app subnet(s) 1560 of FIG. 15) and untrusted app subnet(s) 1662 (e.g. untrusted app subnet(s) 1562 of FIG. 15) of the data plane app tier 1646 and the Internet gateway 1634 contained in the data plane VCN 1618. The trusted app subnet(s) 1660 can be communicatively coupled to the service gateway 1636 contained in the data plane VCN 1618, the NAT gateway 1638 contained in the data plane VCN 1618, and DB subnet(s) 1630 contained in the data plane data tier 1650. The untrusted app subnet(s) 1662 can be communicatively coupled to the service gateway 1636 contained in the data plane VCN 1618 and DB subnet(s) 1630 contained in the data plane data tier 1650. The data plane data tier 1650 can include DB subnet(s) 1630 that can be communicatively coupled to the service gateway 1636 contained in the data plane VCN 1618.

The untrusted app subnet(s) 1662 can include primary VNICs 1664(1)-(N) that can be communicatively coupled to tenant virtual machines (VMs) 1666(1)-(N) residing within the untrusted app subnet(s) 1662. Each tenant VM 1666(1)-(N) can run code in a respective container 1667(1)-(N), and be communicatively coupled to an app subnet 1626 that can be contained in a data plane app tier 1646 that can be contained in a container egress VCN 1668. Respective secondary VNICs 1672(1)-(N) can facilitate communication between the untrusted app subnet(s) 1662 contained in the data plane VCN 1618 and the app subnet contained in the container egress VCN 1668. The container egress VCN can include a NAT gateway 1638 that can be communicatively coupled to public Internet 1654 (e.g. public Internet 1354 of FIG. 13).

The Internet gateway 1634 contained in the control plane VCN 1616 and contained in the data plane VCN 1618 can be communicatively coupled to a metadata management service 1652 (e.g. the metadata management system 1352 of FIG. 13) that can be communicatively coupled to public Internet 1654. Public Internet 1654 can be communicatively coupled to the NAT gateway 1638 contained in the control plane VCN 1616 and contained in the data plane VCN 1618. The service gateway 1636 contained in the control plane VCN 1616 and contained in the data plane VCN 1618 can be communicatively couple to cloud services 1656.

In some examples, the pattern illustrated by the architecture of block diagram 1600 of FIG. 16 may be considered an exception to the pattern illustrated by the architecture of block diagram 1500 of FIG. 15 and may be desirable for a customer of the IaaS provider if the IaaS provider cannot directly communicate with the customer (e.g., a disconnected region). The respective containers 1667(1)-(N) that are contained in the VMs 1666(1)-(N) for each customer can be accessed in real-time by the customer. The containers 1667(1)-(N) may be configured to make calls to respective secondary VNICs 1672(1)-(N) contained in app subnet(s) 1626 of the data plane app tier 1646 that can be contained in the container egress VCN 1668. The secondary VNICs 1672(1)-(N) can transmit the calls to the NAT gateway 1638 that may transmit the calls to public Internet 1654. In this example, the containers 1667(1)-(N) that can be accessed in real-time by the customer can be isolated from the control plane VCN 1616 and can be isolated from other entities contained in the data plane VCN 1618. The containers 1667(1)-(N) may also be isolated from resources from other customers.

In other examples, the customer can use the containers 1667(1)-(N) to call cloud services 1656. In this example, the customer may run code in the containers 1667(1)-(N) that requests a service from cloud services 1656. The containers 1667(1)-(N) can transmit this request to the secondary VNICs 1672(1)-(N) that can transmit the request to the NAT gateway that can transmit the request to public Internet 1654. Public Internet 1654 can transmit the request to LB subnet(s) 1622 contained in the control plane VCN 1616 via the Internet gateway 1634. In response to determining the request is valid, the LB subnet(s) can transmit the request to app subnet(s) 1626 that can transmit the request to cloud services 1656 via the service gateway 1636.

It should be appreciated that IaaS architectures 1300, 1400, 1500, 1600 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 17:
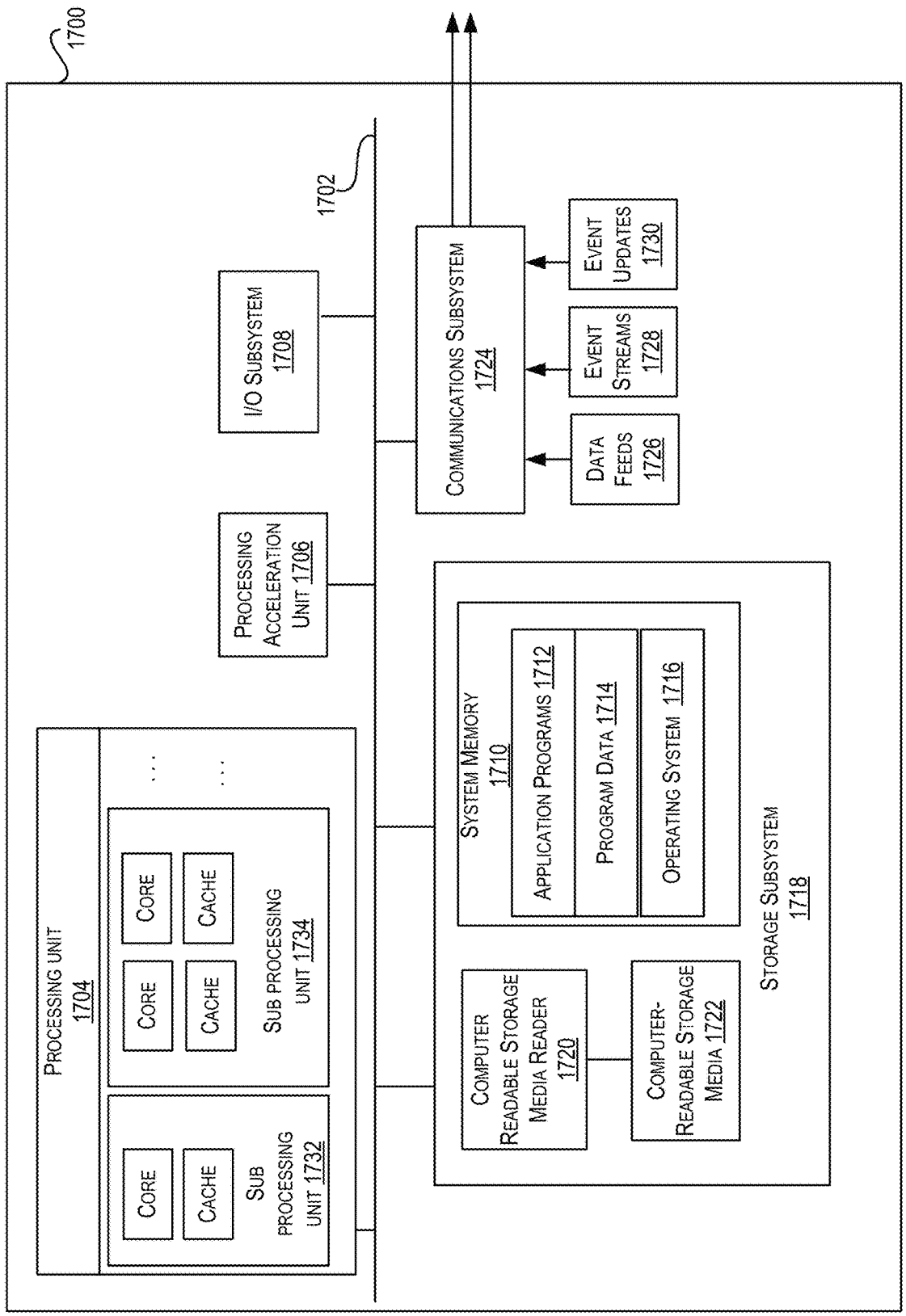
FIG. 17 is a block diagram illustrating an example computer system, according to at least one embodiment.

FIG. 17 illustrates an example computer system 1700, in which various embodiments may be implemented. The system 1700 may be used to implement any of the computer systems described above. As shown in the figure, computer system 1700 includes a processing unit 1704 that communicates with a number of peripheral subsystems via a bus subsystem 1702. These peripheral subsystems may include a processing acceleration unit 1706, an I/O subsystem 1708, a storage subsystem 1718 and a communications subsystem 1724. Storage subsystem 1718 includes tangible computer-readable storage media 1722 and a system memory 1710.

Bus subsystem 1702 provides a mechanism for letting the various components and subsystems of computer system 1700 communicate with each other as intended. Although bus subsystem 1702 is shown schematically as a single bus, alternative embodiments of the bus subsystem may utilize multiple buses. Bus subsystem 1702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1704, which can be implemented as one or more integrated circuits (e.g., a conventional microprocessor or microcontroller), controls the operation of computer system 1700. One or more processors may be included in processing unit 1704. These processors may include single core or multicore processors. In certain embodiments, processing unit 1704 may be implemented as one or more independent processing units 1732 and/or 1734 with single or multicore processors included in each processing unit. In other embodiments, processing unit 1704 may also be implemented as a quad-core processing unit formed by integrating two dual-core processors into a single chip.

In various embodiments, processing unit 1704 can execute a variety of programs in response to program code and can maintain multiple concurrently executing programs or processes. At any given time, some or all of the program code to be executed can be resident in processor(s) 1704 and/or in storage subsystem 1718. Through suitable programming, processor(s) 1704 can provide various functionalities described above. Computer system 1700 may additionally include a processing acceleration unit 1706, which can include a digital signal processor (DSP), a special-purpose processor, and/or the like.

I/O subsystem 1708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1700 may comprise a storage subsystem 1718 that comprises software elements, shown as being currently located within a system memory 1710. System memory 1710 may store program instructions that are loadable and executable on processing unit 1704, as well as data generated during the execution of these programs.

Depending on the configuration and type of computer system 1700, system memory 1710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1704. In some implementations, system memory 1710 may include multiple different types of memory, such as static random access memory (SRAM) or dynamic random access memory (DRAM). In some implementations, a basic input/output system (BIOS), containing the basic routines that help to transfer information between elements within computer system 1700, such as during start-up, may typically be stored in the ROM. By way of example, and not limitation, system memory 1710 also illustrates application programs 1712, which may include client applications, Web browsers, mid-tier applications, relational database management systems (RDBMS), etc., program data 1714, and an operating system 1716. By way of example, operating system 1716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 17 OS, and Palm® OS operating systems.

Storage subsystem 1718 may also provide a tangible computer-readable storage medium for storing the basic programming and data constructs that provide the functionality of some embodiments. Software (programs, code modules, instructions) that when executed by a processor provide the functionality described above may be stored in storage subsystem 1718. These software modules or instructions may be executed by processing unit 1704. Storage subsystem 1718 may also provide a repository for storing data used in accordance with the present disclosure.

Storage subsystem 1700 may also include a computer-readable storage media reader 1720 that can further be connected to computer-readable storage media 1722. Together and, optionally, in combination with system memory 1710, computer-readable storage media 1722 may comprehensively represent remote, local, fixed, and/or removable storage devices plus storage media for temporarily and/or more permanently containing, storing, transmitting, and retrieving computer-readable information.

Computer-readable storage media 1722 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1700.

By way of example, computer-readable storage media 1722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1700.

Communications subsystem 1724 provides an interface to other computer systems and networks. Communications subsystem 1724 serves as an interface for receiving data from and transmitting data to other systems from computer system 1700. For example, communications subsystem 1724 may enable computer system 1700 to connect to one or more devices via the Internet. In some embodiments communications subsystem 1724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1724 can provide wired network connectivity (e.g., Ethernet) in addition to or instead of a wireless interface.

In some embodiments, communications subsystem 1724 may also receive input communication in the form of structured and/or unstructured data feeds 1726, event streams 1728, event updates 1730, and the like on behalf of one or more users who may use computer system 1700.

By way of example, communications subsystem 1724 may be configured to receive data feeds 1726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1724 may also be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1724 may also be configured to output the structured and/or unstructured data feeds 1726, event streams 1728, event updates 1730, and the like to one or more databases that may be in communication with one or more streaming data source computers coupled to computer system 1700.

Computer system 1700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
    receiving, by an aggregation system of a cloud system and from a data catalog, one or more events from one or more data sources of the cloud system, the one or more data sources having one or more resource types;
    storing, by the aggregation system, event data to a message queue;
    separating, by the aggregation system, the event data in the message queue into a set of processed events and a set of unprocessed events;
    processing, by one or more workers of the cloud system, subsets of the set of unprocessed events from the event data in the message queue, where the processing of the subsets of the set of unprocessed events by the one or more workers is coordinated using a high watermark that indicates a point in the message queue separating the set of processed events from the set of unprocessed events;
    for each event in each of the subsets of the set of unprocessed events:
        determining whether an event source has been updated based on information in the event;
    in accordance with a determination that the event source has been updated, sending an updated status to a dashboard, the dashboard configured to be displayed on a user device; and
    moving, by at least one of the one or more workers of the cloud system, the high watermark in response to processing the subset of the set of unprocessed events.

2. The method of claim 1, wherein the one or more resource types include at least one of: data assets, data entities, filename patterns, logical data entities, attributes, glossaries, categories, terms, data catalog tags, or jobs.

3. The method of claim 1, further comprising:
    receiving, by the aggregation system, an event from a data source with a new resource type without the aggregation system being reconfigured.

4. The method of claim 1, wherein the message queue comprises a common queue for events from the one or more data sources and the one or more resource types in a common queue.

5. The method of claim 4, wherein the one or more workers receives a subset of common queue events from the message queue.

6. The method of claim 1, further comprising:
    separating into one or more customer subsets before processing, where a customer subset comprises events associated with one tenant identifier (tenant ID).

7. The method of claim 1, further comprising:
    for each event in the subset of events:
        identifying, by the data catalog the event source with a first status;
        creating, by the data catalog, a second status for the event source based at least in part on the event; and
        determining, by the data catalog, whether the event source has been updated based at least in part on a comparison of the first status and the second status.

8. A non-transitory computer-readable storage medium storing a set of instructions, that, when executed by one or more processors of an aggregation system computing device of a cloud system, cause the one or more processors to perform instructions comprising:

receiving from a data catalog one or more events from one or more data sources of the cloud system, the data sources having one or more resource types;

storing event data to a message queue;

separating, by the aggregation system, the event data in the message queue into a set of processed events and a set of unprocessed events;

processing, by one or more workers of the cloud system, subsets of the set of unprocessed events from event data in the message queue, where the processing of the subsets of the set of unprocessed events by the one or more workers is coordinated using a high watermark that indicates a point in the message queue separating the set of processed events from the set of unprocessed events;

for each event in each of the subset of the set of unprocessed events:

determining whether an event source has been updated based on information in the event;

in accordance with a determination that the event source has been updated, sending an updated status to a dashboard, the dashboard configured to be displayed on a user device; and moving, by at least one of the one or more workers of the cloud system, the high watermark in response to processing the subset of the set of unprocessed events.

9. The non-transitory computer-readable storage medium of claim 8, wherein the one or more resource types include at least on of: data assets, data entities, filename patterns, logical data entities, attributes, glossaries, categories, terms, data catalog tags, and jobs.

10. The non-transitory computer-readable storage medium of claim 8, wherein the instructions further comprise:

receiving, by the aggregation system, an event from a data source with a new resource type without the aggregation system being configured.

11. The non-transitory computer-readable storage medium of claim 8, wherein the message queue comprises a common queue for events from the one or more data sources and the one or more resource types in a common queue, wherein the one or more workers receives a subset of common queue events from the message queue.

12. The non-transitory computer-readable storage medium of claim 9, wherein the instructions further comprise:

separating into one or more customer subsets before processing, where a customer subset comprises events associated with one tenant identifier (tenant ID).

13. The non-transitory computer-readable storage medium of claim 8, further comprising:

for each event in the subset of events:

identifying, by the data catalog the event source with a first status;

creating, by the data catalog, a second status for the event source based at least in part on the event; and determining, by the data catalog, whether the event source has been updated based at least in part on a comparison of the first status and the second status.

14. An aggregation system, comprising:

memory storing computer-executable instructions; and one or more processors configured to access the memory, and execute the computer-executable instructions to at least:

receive from a data catalog one or more events from one or more data sources of a cloud system, the data sources having one or more resource types;

store event data to a message queue;

separate the event data in the message queue into a set of processed events and a set of unprocessed events;

process, by one or more workers of the cloud system, subsets of the set of unprocessed events from the event data in the message queue, where the processing of the subset of the set of unprocessed events by the one or more workers is coordinated using a high watermark that indicates a point in the message queue separating the set of processed events from the set of unprocessed events;

for each event in each of the subset of the set of unprocessed events:

determining whether an event source has been updated based on information in the event;

in accordance with a determination that the event source has been updated, send an updated status to a dashboard, the dashboard configured to be displayed on a user device; and moving, by at least one of the one or more workers of the cloud system, the high watermark in response to processing the subset of the set of unprocessed events.

15. The aggregation system of claim 14, wherein the one or more processors further execute the computer-executable instructions to at least:

receive, by the aggregation system, an event from a data source with a new resource type without the aggregation system being configured.

16. The aggregation system of claim 14, wherein the message queue comprises a common queue for events from the one or more data sources and the one or more resource types in a common queue, wherein the one or more workers receives a subset of common queue events from the message queue.

17. The aggregation system of claim 14, further comprising:

for each event in the subset of events:

identifying, by the data catalog the event source with a first status;

creating, by the data catalog, a second status for the event source based at least in part on the event; and determining, by the data catalog, whether the event source has been updated based at least in part on a comparison of the first status and the second status.

* * * * *

UNITED STATES PATENT AND TRADEMARK OFFICE
CERTIFICATE OF CORRECTION

PATENT NO. : 11,876,875 B2
APPLICATION NO. : 17/497186
DATED : January 16, 2024
INVENTOR(S) : Banerjee et al.

Page 1 of 1

It is certified that error appears in the above-identified patent and that said Letters Patent is hereby corrected as shown below:

In the Specification

In Column 22, Line 27, delete "smartNlCs)," and insert -- smartNICs), --, therefor.

In Column 29, Line 34, delete "1414," and insert -- 14, --, therefor.

In Column 34, Line 6, delete "and or" and insert -- and/or --, therefor.

In Column 39, Line 20, delete "smartNlC" and insert -- smartNIC --, therefor.

In Column 39, Line 22, delete "smartNlC" and insert -- smartNIC --, therefor.

In Column 39, Line 24, delete "smartNlCs" and insert -- smartNICs --, therefor.

In Column 39, Line 26, delete "smartNlC" and insert -- smartNIC --, therefor.

In Column 39, Line 48, delete "smartNlC" and insert -- smartNIC --, therefor.

In Column 42, Line 38, delete "smartNlCs," and insert -- smartNICs, --, therefor.

In Column 43, Line 52, delete "smartNlC," and insert -- smartNIC, --, therefor.

In Column 45, Line 45, delete "Tier-0-switch" and insert -- Tier-0 switch --, therefor.

In Column 59, Line 45, delete "evolution)," and insert -- evolution)), --, therefor.

In the Claims

In Column 63, Line 46, in Claim 12, delete "claim 9," and insert -- claim 8, --, therefor.

Signed and Sealed this
Fourteenth Day of May, 2024

Katherine Kelly Vidal
*Director of the United States Patent and Trademark Office*